(12) United States Patent
Jia et al.

(10) Patent No.: US 9,247,029 B1
(45) Date of Patent: *Jan. 26, 2016

(54) EFFICIENT PROCESSING OF STREAMS OF IMAGES WITHIN A MOVING WINDOW SESSION

(71) Applicant: GOOGLE INC., Mountain View, CA (US)

(72) Inventors: Wei Jia, San Jose, CA (US); Ronghua Wu, El Cerrito, CA (US)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/289,198

(22) Filed: May 28, 2014

Related U.S. Application Data

(63) Continuation of application No. 13/541,410, filed on Jul. 3, 2012, now Pat. No. 8,774,536.

(51) Int. Cl.
*G06K 9/36* (2006.01)
*H04L 29/06* (2006.01)

(52) U.S. Cl.
CPC ..................... *H04L 67/42* (2013.01)

(58) Field of Classification Search
USPC ........................................... 382/203
See application file for complete search history.

(56) References Cited

U.S. PATENT DOCUMENTS

| | | | |
|---|---|---|---|
| 6,148,033 A | 11/2000 | Pearlstein et al. | |
| 6,573,915 B1 | 6/2003 | Sivan et al. | |
| 7,114,129 B2 | 9/2006 | Awada et al. | |
| 7,751,482 B1 | 7/2010 | Srinivasan et al. | |
| 8,774,536 B1 * | 7/2014 | Jia et al. | 382/232 |
| 2004/0001544 A1 | 1/2004 | Mehrotra | |
| 2009/0237728 A1 | 9/2009 | Yamamoto | |
| 2009/0307428 A1 | 12/2009 | Schmieder et al. | |
| 2010/0026608 A1 | 2/2010 | Adams et al. | |
| 2010/0235583 A1 | 9/2010 | Gokaraju et al. | |
| 2011/0010629 A1 | 1/2011 | Castro et al. | |
| 2011/0219331 A1 | 9/2011 | DeLuca et al. | |

OTHER PUBLICATIONS

Mozilla, "Introduction to Video Coding Part 1: Transform Coding", published online at http://people.xiph.org/~tterribe/pubs/lca2012/auckland/intro_to_video1.pdf, retrieved on Mar. 13, 2012, 171 pages.
Non-Final Office Action for U.S. Appl. No. 13/541,410, mailed Oct. 8, 2013, 6 pages.
Non-Final Office Action Response for U.S. Appl. No. 13/541,410, filed Dec. 23, 2013, 9 pages.
Notice of Allowance for U.S. Appl. No. 13/541,410, mailed Feb. 28, 2014, 5 pages.

* cited by examiner

*Primary Examiner* — Duy M Dang
(74) *Attorney, Agent, or Firm* — Brake Hughes Bellermann LLP

(57) ABSTRACT

In one general aspect, a computer-readable storage medium storing instructions that when executed cause one or more processors to perform a process that can include sending from a client device to a host device an indicator of a size of a target display area of a moving window session with respect to a host display area of an application operating at the host device where the application can be remotely controlled via the client device. The process can include analyzing a stream of images associated with the target display area of the moving window session and defining at the client device a plurality of regions within the target display area based on the analyzing. The process can also include modifying the moving window session without terminating the moving window session and without establishing a new moving window session.

20 Claims, 17 Drawing Sheets

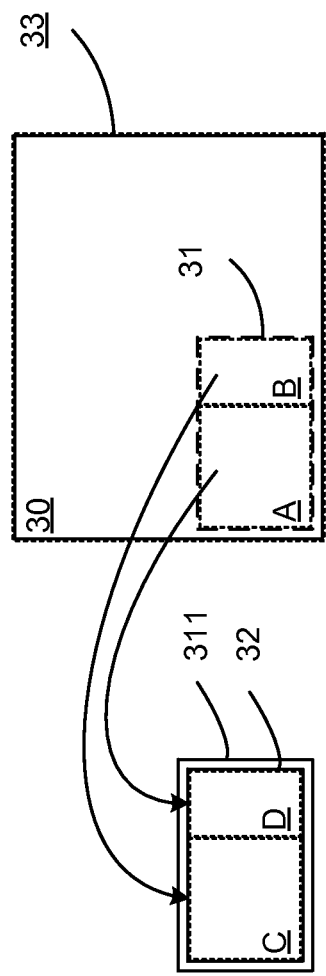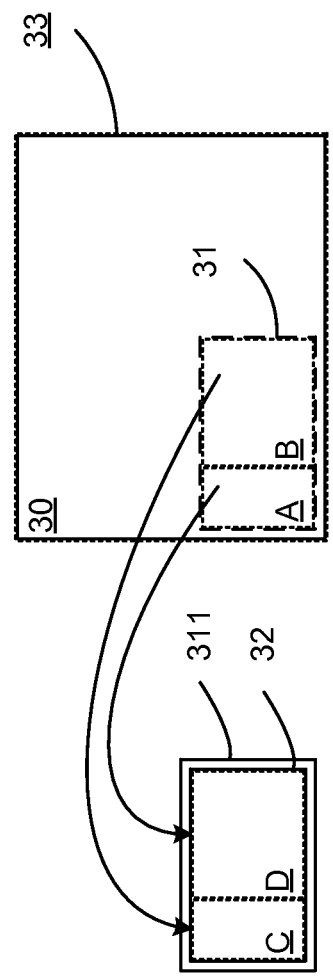

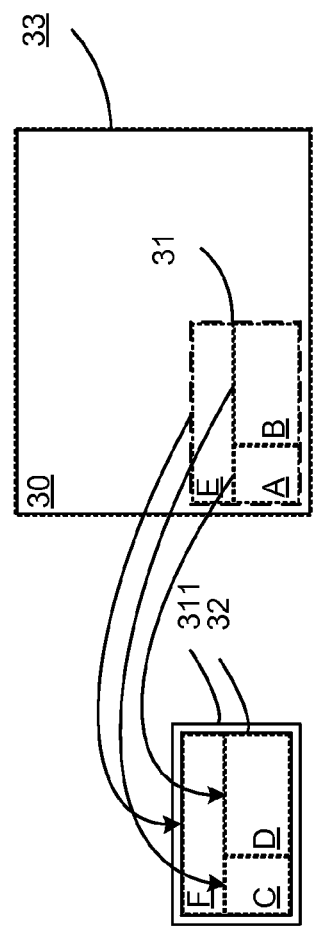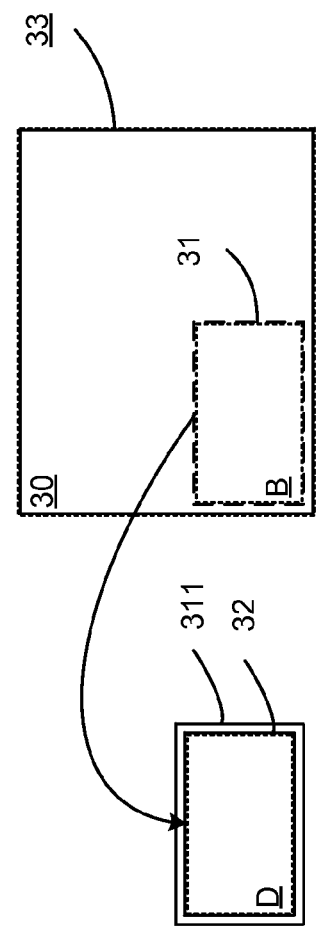

EFFICIENT PROCESSING OF STREAMS OF IMAGES WITHIN A MOVING WINDOW SESSION

CROSS-REFERENCE TO RELATED APPLICATION

This application is a continuation of, and claims priority to, U.S. patent application Ser. No. 13/541,410, filed on Jul. 3, 2012, entitled "EFFICIENT PROCESSING OF STREAMS OF IMAGES WITHIN A MOVING WINDOW SESSION", the disclosure of which is incorporated by reference herein in its entirety.

TECHNICAL FIELD

This description relates to processing of streams of images within a moving window session.

BACKGROUND

A client device can be used to interact with an application operating at a host device via a client-host session (e.g., a client-host session). The host device can be configured to define a stream of images (e.g., stream of screenshots) representing the interactions of the client device with the application, and can send the stream of images to the client device as the interactions are occurring via the client-host session. In some known client-host systems, the image processing capabilities of the client device can be different from the image processing capabilities of the host device. In some known client-host systems, the host device can be configured to encode (e.g., compress) the images before sending the images to the client device where they are displayed; the compressed images can consume significant bandwidth over a connection between the client device and the host device. If image updates consume too much bandwidth of the connection, interactions between the client device and the host device during a client-host session can be, for example, disrupted. Also, consumption of bandwidth for updates of the images at the client device can reduce the available bandwidth, which can already be limited, for other functions. Thus, a need exists for systems, methods, and apparatus to address the shortfalls of present technology and to provide other new and innovative features.

SUMMARY

In one general aspect, a computer-readable storage medium can be configured to store instructions that when executed cause one or more processors to perform a process. The process can include sending from a client device to a host device an indicator of a size of a target display area of a moving window session with respect to a host display area of an application operating at the host device where the application can be remotely controlled via the client device and where the host display area can have a resolution different from a resolution of the target display area of the client device. The process can include analyzing a stream of images associated with the target display area of the moving window session, and defining at the client device a plurality of regions within the target display area based on the analyzing.

In another general aspect, an apparatus can include a client connection module configured to exchange a plurality of parameter values with a client device during establishment of a remote desktop session between a host device and the client device. At least a portion of the plurality of parameter values can identify a plurality of refresh rates of a plurality of regions of a target display area with respect to a plurality of host images produced within a host display area by an application operating at the host device. The apparatus can include a client target movement module configured to send an indicator of a position of the target display area with respect to the host display area and an image receiver configured to receive at least a portion of a client image associated with at least one region from the plurality of regions based on the indicator of the position of the target display area with respect to the host display area.

In yet another general aspect, a computer-readable storage medium can be configured to store instructions that when executed cause one or more processors to perform a process. The process can include identifying a compression scheme associated with a remote desktop session between a client device and a host device. The process can include selecting, based on the compression scheme, a change to a graphics setting associated with a user interface of an application operating at the host device and remotely controlled by the client device via the remote desktop session where the change to the graphics setting can be configured to reduce a complexity of the user interface for compression of the user interface of the application.

The details of one or more implementations are set forth in the accompanying drawings and the description below. Other features will be apparent from the description and drawings, and from the claims.

BRIEF DESCRIPTION OF THE DRAWINGS

FIGS. 3A through 3D are diagrams that illustrate regions of a target display area.

DETAILED DESCRIPTION

Figure 1:
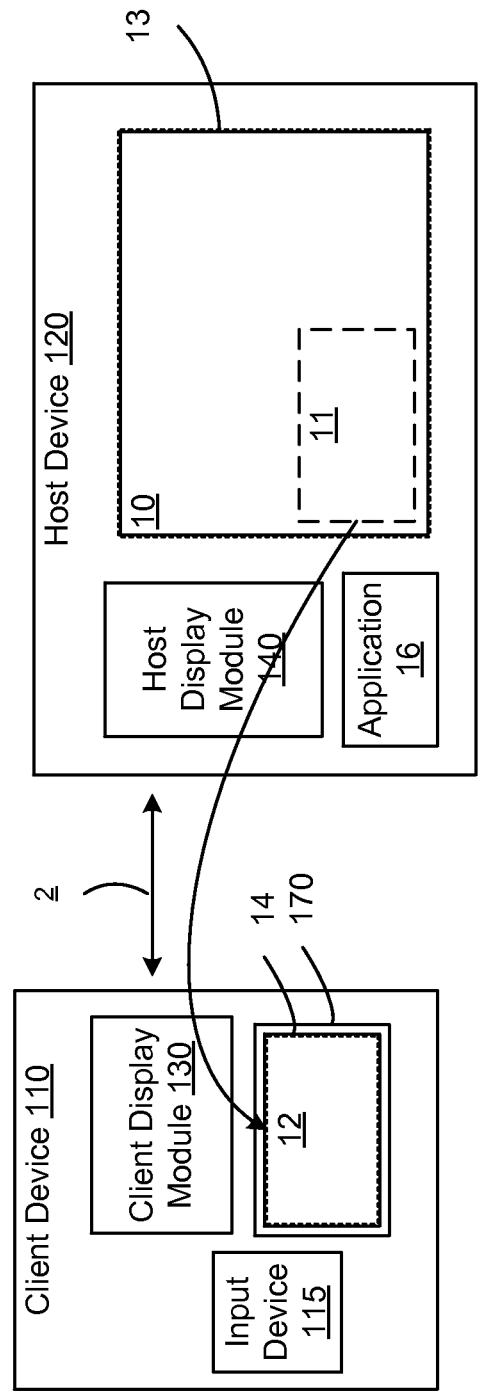
FIG. 1 is a diagram that illustrates a client device and a host device configured to communicate via a moving window session.

FIG. 1 is a diagram that illustrates a client device 110 and a host device 120 configured to communicate via a moving window session (which can be associated with a client-host session or a remote desktop session). The client device 110, in this implementation, is configured to operate as a client (e.g., a thin client) of the host device 120 via, for example, a moving window session. The client device 110 can be used to interact with an application 16 and/or other applications (not shown) operating at the host device 120 via a communication link 2, and the host device 120 can be configured to send to the client device 110 a stream of images (e.g., screen scrapes, screenshots) (also can be referred to as a stream of frames) representing responses to interactions with the application 16 during a moving window session. Accordingly, the processing resources of the host device 120, which may be faster, more efficient, more abundant, etc. than the resources of the client device 110, can be used by the client device 110 to operate the application 16 via the communication link 2 during the moving window session. For example, the stream of images can be screenshots that are updated as the client device 110 is used to interact with the application 16 operating at the host device 120. Interactions with the application 16 can be triggered using an input device 115 (e.g., an indicator (or input value) from the input device 115, a mouse device, a touchscreen device, a keyboard device, a touchpad device, a microphone) of the client device 110 via the stream of images. In some implementations, the interactions with the application 16 can be represented by one or more input values produced by the input device 115. Although only application 16 is shown in this implementation, multiple applications can be operating at the host device 120 and can be controlled via the client device 110 in some implementations.

As a specific example, a user interface associated with the application 16 can be generated at the host device 120 operating the application 16. The client device 110 (e.g., the input device 115 of the client device 110) can be used by a user to interact with the user interface of the application 16 and input values representing the interactions can be sent to the host device 120 via the communication link 2 during a moving window session. Images of the user interface, and interactions with the user interface (which can result in changes to the user interface), can be streamed, via the communication link 2, to the client device 110 where they can be displayed at the client device 110. In some implementations, the stream of images can, for example, define, or can be used to define, images in a video stream.

In this implementation, a client image 12 of (e.g., derived from) a host image 10 associated with the application 16 operating at the host device 120 is sent via the communication link 2 to the client device 110 based on a position (e.g., an x-y position) of a target display area 11 of the host image 10. The client image 12 is displayed (e.g., rendered) in a client display area 14 within a display 170 of the client device 110. In some implementations, the client image 12 can be referred to as a window image, as an image of the target display area 11, or as a captured image of the target display area 11. The target display area 11 outlines a portion (e.g., a relatively small portion, a subset) of the host image 10 as illustrated by the dashed line. The host image 10 can be an image of, for example, a user interface of the application 16 operating at the host device 120. The host image 10 can be one image from a stream of images (e.g., a stream including consecutive images) produced by the application 16 (or using the application 16) at the host device 120 during operation of the application 16. In some implementations, the target display area 11 can be referred to as a target display window or as a target viewing window. In some implementations, the client image 12 can be referred to as a screen cast portion, a capture portion, a fragment of the host image 10, and/or so forth. Although only application 16 is shown in this implementation, multiple applications can be used to produce the host image 10.

As shown in FIG. 1, processing related to the target display area 11 and processing related to the host image 10 are handled by a host display module 140 operating at host device 120. The host display module 140 is configured produce the client image 12 that is sent to the client device 110. The client display module 130 receives the client image 12 (which is a portion of the host image 10 within the target display area 11). The client display module 130 handles processing related to the client image 12 at the client device 110.

Because the display 170 of the client device 110 has an area with a different size than an area of the host image 10 associated with the application 16 at the host device 120, only the target display area 11 of the host image 10 is sent to the client device 110 as the client image 12 for display in the display 170. In some implementations, the host image 10 can be referred to as a full scope image because it is a full resolution image that is produced by the application 16 (and/or other applications operating at host device 120 such as an operating system). The host image 10 can be an image (e.g., a bitmap image, a compressed image, an encoded image) of at least a portion of a host display area 13 (e.g., a full display area, an entire visual user interface operating environment, etc.) associated with the application 16 (and/or other applications operating at the host device 120 such as an operating system). In some implementations, the host image 10 can be referred to as a native host image or as a native image of the host display area 13. The target display area 11 of the host image 10 can be referred to as a target display area because the target display area 11 is a portion of the host image 10 that is targeted to be captured and sent to the client device 110 for viewing as client image 12 within the client display area 14 on the display 170 of the client device 110.

Because the display 170 of the client device 110 has an area that is smaller than an area of the host image 10 (e.g., the host image 10 within the host display area 13) processed at the host device 120, only the client image 12 of the target display area 11 (which includes only a portion of the host image 10) is sent to the client device 110 for display. In this implementation, the client image 12 of the target display area 11 has a resolution that is the same as a resolution of the target display area 11 of the host image 10. In other words, the client image 12 of the target display area 11 is not scaled up or down compared with the target display area 11 of the host image 10. In some implementations, the client image 12 of the target display area 11 can be scaled up or down (e.g., scaled up or down in resolution) from the target display area 11 of the host image 10.

The target display area 11 can be moved within the host display area 13 so that the user of the client device 110 can view other portions (e.g., any portion) of the host image 10, or other host images (not shown). In some implementations, the target display area 11 can be moved from a first position within the host display area 13 of the host image 10 to a second position within the host display area 13 of the host image 10. In some implementations, the host display area 13 can have a size that is the same as, or substantially the same as, the host image 10. In some implementations, the host image 10 can have a size that is different (e.g., smaller, larger) than the host display area 13.

As shown in FIG. 1, the target display area 11 is in a lower-left quadrant of the host display area 13 corresponding with the host image 10. Although not shown in FIG. 1, the client device 110 can be configured so that the target display area 11 can be moved (e.g., triggered to be moved by a user of the client device 110) from the lower-left quadrant of the host image 10 to a new position within the host display area 13. The target display area 11 can be triggered to move within the host display area 13 in response to one or more input values from the input device 115 of the client device 110. In response to the movement of the target display area 11 to the new position within the host display area 13, an image (not shown) of the target display area 11 in the new position of the host image 10, or another image, within the host display area 13 can be sent to the client device 110.

Accordingly, the client device 110 can function as a viewing window, via the target display area 11, into the application 16 (and/or other applications) operating at the host device 120. In other words, the client device 110 can function as an extension of the host device 120 that can be used to view and/or control one or more portions of the application 16 operating in host device 120. In some implementations, a moving window session through which the client device 110 can function as a viewing window, via the target display area 11, into the application 16 operating at host device 120 can be referred to as a viewing window session.

As a specific example, a word processing application (i.e., application 16) can be operating at the host device 120 and controlled at the host device 120 using the client device 110 during a moving window session. The user interface associated with the word processing application can be processed at host device 120 as host images (e.g., host image 10). Portions of the user interface associated with the word processing application can be displayed (e.g., viewed) at the display 170 of the client device 110 as images (e.g., client image 12) based on a location of a target display area (e.g., target display area 11). A user of the client device 110 may interact with the word processing application using the input device 115 via the portions of the user interface that are displayed at the client device 110 and/or may move the target display area using the input device 115. In response to the interaction(s), the user interface associated with the word processing application can be updated, and updated images can be sent to and displayed at the client device 110.

In some implementations, a moving window session can be considered a particular type of remote desktop session where the target display area 11 is smaller in area than the host display area 13 and can be positioned and/or moved within the host display area 13. A remote desktop session may not, in some implementations, be a moving window session where the target display area 11 can be positioned and/or moved within the host display area 13. Instead, in some types of remote desktop sessions, the area (or pixels) viewed at the client device 110, although scaled up or scaled down, can correspond with the host display area 13 so that all (or nearly all) of the host display area 13 can be viewed at the client device 110 rather than viewing of only a portion of the host display area 13 through the target display area 11.

In some implementations, the client display module 130 and the host display module 140 are configured to exchange parameter values related to establishment of a moving window session. In some implementations, the parameter values can define various characteristics (e.g., aspects) of the moving window session. The parameter values can include startup parameter values or initialization parameter values exchanged between the client display module 130 and the host display module 140 as the moving window session is being established. The parameter values can also include modification parameter values exchanged between the client display module 130 and the host display module 140 to modify the moving window session after the moving window session has been established. Specifically, modification parameter values can be exchanged to dynamically modify (e.g., dynamically modify more than once) the moving window session during a single moving window session (e.g., single client-host session) without terminating the current moving window session and establishing a new moving window session. In other words, the moving window session between a client device 110 and a host device 120 can be dynamically modified using modification parameter values.

In some implementations, the parameter values can be used to specify various characteristics (e.g., aspects) of the moving window session including dimensions (e.g., a size, an area, an aspect ratio, height/width values), resolutions, grid sizes, coordinate systems, origins, offsets of the target display area 11, the host image 10, the host display area 13, the client image 12, and/or so forth. In some implementations, the parameter values can specify one or more compression schemes used to process images transmitted between the client device 110 and the host device 120. In some implementations, the compression scheme can specify, for example, a compression-decompression (codec) algorithm, a frame rate or refresh rate, a transmission protocol, and/or so forth.

In this implementation, the client display module 130 can be configured to dynamically trigger a change in a size of the target display area 11 during a moving window session (e.g., a single client-host or moving window session) established between the client device 110 the host device 120. For example, during a moving window session, the client display module 130 can be configured to request viewing of host images (e.g., host image 10) within the target display area 11 of the host display area 13 based on an initial set of parameter values. During the same moving window session, the client display module 130 can be configured to request viewing a host images within a new target display area (not shown) modified from the target display area 11 based on modification parameter values. The modification parameter values can be triggered by a user dynamically changing the target display area 11 to the new target display area. The new target display area can have a different resolution, different aspect ratio, different origin, etc. compared with the target display area 11 (i.e., the old target display area location). In some implementations, the target display area 11, which is modified to the new target display area, can be referred to as a prior target display area, a previous target display area, as an original target display area, and so forth. The new target display area, in some implementations, can be referred to as an updated target display area, a subsequent target display area, and so forth. As illustrated by this implementation, the target display area 11 can be modified without disconnecting or terminating the moving window session.

Although not shown in FIG. 1, in some implementations, a moving window session can be divided into different regions (e.g., sections, segments, portions). For example, the different regions of, for example, the target display area 11 can be managed based on different parameter values (e.g., initialization parameter values, modification parameter values). As a specific example, a first region of the target display area 11 can be manage based on a first set of parameter values, and a second region of the target display area 11 can be managed based on a second set of parameter values. In some implementations, the parameter values can include, for example, an identifier, an offset in one or more coordinate directions (e.g., x-coordinate value, y-coordinate value), a width, a height, a timestamp, and/or so forth In some implementations, the different sets of parameter values can be defined based on movement within images of the stream of images. For example, the first region of the target display area 11 may include dynamically changing video content that is managed based on the first set of parameter values, which can be tailored to efficient compression of the video content. Specifically, the first region of the target display area 11 can be updated (based on the first of parameter values) at a relatively high frame rate within a stream of images sent from the host device 120 to the client device 110 because of the dynamically changing video content. The second region of the target display area 11 may include static text that is managed based on the second set of parameter values, which can be tailored to the relatively static content. Specifically, the second region of the target display area 11 can be updated (based on the second set of parameter values) at a relatively low frame rate within the stream of images sent from the host device 122 to the client device 110 because the content in the second region is static. More details related to exchange of parameter values associated with the moving window session are described below.

In some implementations, different regions within the target display area 11 can be modified dynamically. For example, dimensions of a first region within the target display area 11 and dimensions of a second region within the target display area 11 can be dynamically changed. The different regions within the target display area 11 can be defined and/or modified based on one or more parameter values. In some implementations, parameter values sent at a later time can replace parameter values sent previously. In some implementations, regions within the target display area 11 can be removed, or added dynamically. More details related to different regions within a target display area are described in connection with the figures below.

In any type of remote desktop session (including a moving window session), one or more graphics settings of the application 16 can be modified so that compression of images transmitted between the host device 120 and the client device 110 can be handled in a desirable fashion (e.g., in an efficient fashion). For example, the complexity of a user interface of the application 16 (and/or other applications) can be reduced to facilitate more efficient compression of images of the host display area 13 for viewing at the client device 110 during a remote desktop session. As another example, the complexity of a user interface of the application 16 can be reduced to facilitate more efficient compression of, for example, the target display area 11 as the client image 12 during a moving window session.

The changing of graphics settings of the application 16 can include, for example, reducing the complexity of a background image, adding anti-aliasing to font rendering, removing desktop icons, using non-overlapping window layouts, removing alpha blending, removing fade in and fade out effects (e.g., animation), reducing font colors, changing shapes (e.g., rounded edges) on objects, removing three-dimensional effects (e.g., animation), and/or so forth. In some implementations, the graphics settings of the application 16 can be modified based on (e.g., in response to) a compression scheme used to handle images between the client device 110 and the host device 120. More details related to modification of graphics settings associated with an application are described in connection with the figures below.

Although not shown in FIG. 1, in some implementations, the host image 10 may be displayed at the host device 120 on a display of host device 120. In some implementations, the host image 10 may not be displayed at the host device 120, but may instead be processed at the host device 120 by one or more processors (not shown) and/or may be stored (e.g., temporarily store) in the memory (not shown) of the host device 120.

In some implementations, the communication link 2 can be, for example, a wireless communication link, a wired communication link, a network communication link, and/or so forth. As used herein, the term "moving window session" can include any technologies and/or protocols in which commands (e.g., input values) issued from a local client are used to control the functionality (e.g., operation) of a host device (e.g., host device 120) including, for example, Windows Remote Desktop™, Citrix™, WebEx™ etc. technologies and/or protocols.

In some implementations, the client device 110 and/or the host device 120 can each be, for example, a wired device and/or a wireless device (e.g., wi-fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. The computing device(s) can be configured to operate based on one or more platforms (e.g., one or more similar or different platforms) that can include one or more types of hardware, software, firmware, operating systems, runtime libraries, and/or so forth.

Figure 2:
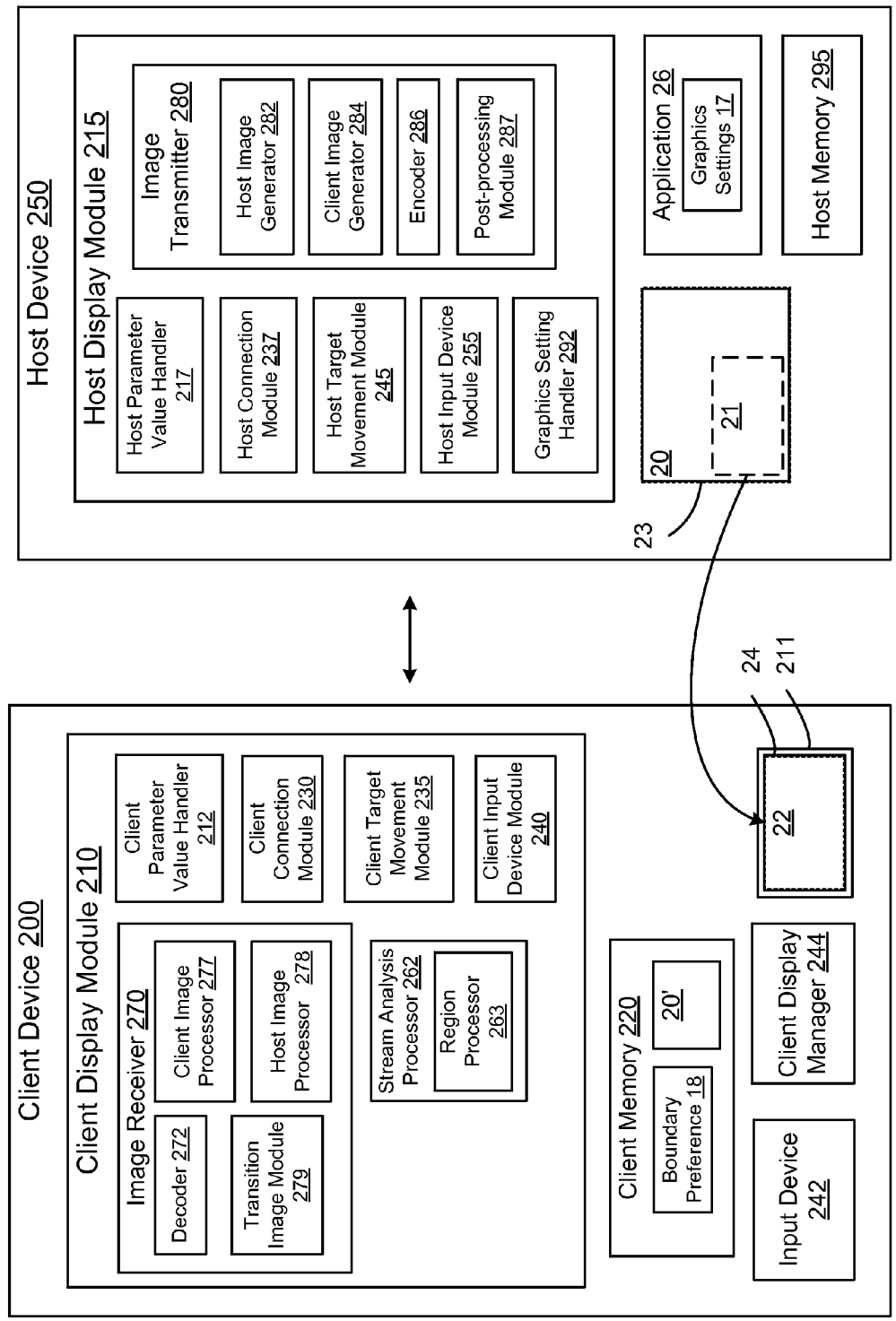
FIG. 2 is a diagram that illustrates a client device including a client display module and the host device including a host display module.

FIG. 2 is a diagram that illustrates a client device 200 including a client display module 210 and a host device 250 including a host display module 215. The host device 250 and the client device 200 can be configured to communicate via a moving window session associated with a moving window session (e.g., a remote desktop session). The client device 200 can be used to interact with an application 26 operating at the host device 250, and the host device 250 can be configured to send to the client device 200 a client image 22 (which can be from a stream of client images) that is a portion of a host image 20 (which can be from a stream of host images produced using the application 26). The client image 22 can be displayed within a client display area 24. The client image 22, which can be displayed at a display 211 of the client device 200, can be produced based on a target display area 21 within a host display area 23 (illustrated by dashed line) of the host image 20. In some implementations, the host image 20 can be produced based on, for example, interactions with the application 26 during the moving window session. The client image 22 can be updated (e.g., replaced with different client images) within the display 211 of the client device 110 as interactions with the application 26 operating at the host device 250 occur. Interactions with the application 26 can be triggered using an input device 242 (e.g., a mouse device, a keyboard device, a touchscreen device, a touchpad device) of the client device 200 via the client image 22 (and/or updates thereof).

In some implementations, the application 26 can be any type of application operating at the host device 250. For example, the application 26 can be a word processing program, a video application, an operating system (or a portion thereof), a browser, and/or so forth. Although illustrated as a single application, in some implementations, the host device 250 can be configured to operate multiple applications that can be associated with one or more moving window sessions.

The host image 20 can be produced by a host image generator 282 of an image transmitter 280 during a moving window session. Specifically, the host image 20 (and other host images which can be included in a stream of host images (not shown)) can be produced (e.g., produced as a bitmap) in response processing performed by the application 26. Also shown in FIG. 2, the image transmitter 280 includes a client image generator 284. The client image generator 284 is configured to produce the client image 22 (and other client images which can be included in a stream of client images (not shown)) from the host image 20 based on a position (e.g., an x-y position) of the target display area 21 within the host display area 23 of the host image 20. Specifically, the client image generator 284 is configured to produce the client image 22 as an image that corresponds with the target display area 21 within the host display area 23 of the host image 20.

As shown in FIG. 2, the client display module 210 includes an image receiver 270. The image receiver 270 includes a client image processor 277 configured to process (e.g., parse, store) images produced by the client image generator 284 during a moving window session. Also, the image receiver 270 includes a host image processor 278 configured to process (e.g., parse, store) images produced by the host image generator 282.

As shown in FIG. 2, the client display module 210 includes a client parameter value handler 212, and the host display module 215 includes a host parameter value handler 217. The client parameter value handler 212 and/or the host parameter value handler 217 can be configured to define parameter values (e.g., initialization parameter values, modification parameter values) for a moving window session between the client device 200 and host device 250. In some implementations, the client parameter value handler 212 can be configured to define parameter values that are received by the host parameter value handler 217 and implemented at the host device 250. As discussed above, in some implementations, the parameter values can be used to specify various characteristics of the moving window session including dimensions (e.g., a size, an area, an aspect ratio, height/width values), resolutions, grid sizes, coordinate systems, origins, offsets of the target display area 21, the host image 20, the host display area 23, the client image 22, and/or so forth. In some implementations, the parameter values can specify one or more compression schemes used to process images transmitted between the client device 210 and the host device 250. In some implementations, the compression scheme can specify, for example, a compression-decompression (codec) algorithm, a frame rate or a refresh rate, a transmission protocol, and/or so forth.

As shown in FIG. 2, the image transmitter 280 includes an encoder 286, and the image receiver 270 includes a decoder 272. The processing performed by the encoder 286 and/or the decoder 272 can be defined by one or more of the parameter values defined by the client parameter value handler 212 and/or the host parameter value handler 217.

In some implementations, the encoder 286 is configured to encode (e.g., compress, encode using an encoding algorithm) one or more images before the images are sent from host device 250 to the client device 200. In some implementations, the encoder 286 can be configured to encode one or more images based on a proprietary encoding algorithm, a lossy encoding algorithm, a lossless encoding algorithm, a motion picture editors group (MPEG) compression algorithm (e.g., MPEG-2, MPEG-4), and/or so forth. The encoding performed by the encoder 286 can be specified by or more parameter values defined by the client parameter value handler 212 and/or the host parameter value handler 217. In some implementations, the encoder 286 is configured to encode the portion of the host image 20 that is transmitted to the client device 200 as client image 22 within the client display area 24. In other words, in some implementations, the client image 22 can be encoded by the encoder 286 of the image transmitter 280 at the host device 250 before the client image 22 is sent to the client device 200.

The decoder 272 is configured to decode images that have been encoded at the host device 250 and are received at the client device 200. In some implementations, the decoder 272 can be a decoder that corresponds with the encoder 286 of host device 250. Accordingly, the decoder 272 can be configured to decode any image that is encoded by the encoder 286. For example, if the client image 22 is encoded at the host device 250 before being received at the client device 200, the decoder 272 can be used to decode the client image 22 so that the client image 22 can be displayed at the display 211 within the client display area 24. The decoding performed by the decoder 272 can be specified by or more parameter values defined by the client parameter value handler 212 and/or the host parameter value handler 217.

The client display module 210 includes a client connection module 230 configured to establish at least a portion of a moving window session (e.g., client-host session) between the client device 200 and the host device 250. Similarly, the host display module 215 includes a host connection module 237 configured to establish at least a portion of a connection between the client device 200 and the host device 250. In some implementations, the connection between the client device 200 and host device 250 during a moving window session can be a wireless connection, a wired connection, a peer-to-peer connection, a network connection, a secure connection, an encrypted connection, and/or so forth.

In some implementations, the client parameter value handler 212 and the host parameter value handler 217 are configured to exchange initialization parameter values related to establishment of a moving window session (e.g., a client-host session including a moving window session) and/or exchange modification parameter values related to modifying the moving window session (e.g., an in-progress moving window session). In some implementations, initialization parameter values and/or modification parameter values can be related to the target display area 21. For example, the client parameter value handler 212 can be configured to define and send an initial position value(s) (e.g., an initial location, an initial offset) and/or a modified position value(s) (e.g., a modified location, a modified offset) for the target display area 21 to the host parameter value handler 217, or vice versa. The initial position value(s) and/or the modified position value(s) can specify, for example, an initial position and/or a modified position, respectively, of the target display area 21 within the host display area 23. In some implementations, the initial position value(s) and/or the modified position value(s) can be, or can include, for example, target coordinates of an initial position and/or a modified position, respectively, of the target display area 21 with respect to an origin of the host display area 23. The parameter values exchanged between the client parameter value handler 212 and host parameter value handler 217 can be exchanged during initialization and/or modification of the moving window session via the client connection module 230 and the host connection module 237.

For example, the host parameter value handler 217 can be configured to send (e.g., send via the host connection module 237) an indicator (e.g., a parameter value) that is received (e.g., received via the client connection module 230) at the client parameter value handler 212 that the host display module 215 is configured (e.g., enabled) or not configured (e.g., not enabled) to support display of less than all of the host display area 23 associated with the application 26. In other words, the host parameter value handler 217 and the client parameter value handler 212 can be configured to exchange parameter values indicating capability to communicate via a moving window session.

In some implementations, the client parameter value handler 212 and the host parameter value handler 217 are configured to exchange initialization parameter values related to establishment of a region of (e.g., less than all of) a moving window session (e.g., a client-host session including a moving window session) and/or exchange modification parameter values related to modifying a region of (e.g., less than all of) the moving window session (e.g., a region of an in-progress moving window session). The parameter values exchanged between the client parameter value handler 212 and host parameter value handler 217 can be exchanged during initialization and/or modification of a region of the moving window session via the client connection module 230 and the host connection module 237. Images (or portions thereof) associated with the different regions can define the client image 22.

Regions of a moving window session are illustrated in FIG. 3A. FIG. 3A illustrates regions A and B of a target display area 31 within the host image 30 in the host display area 33. The regions A and B of the target display area 31 correspond with regions C and D of the client display area 32 within the client display 370. The region A of the target display area 31 and corresponding region C of the client display area 32 can be handled based on a first set of parameter values, and the region B of the target display area 31 and corresponding region C of the client display area 32 can be handled based on a second set of parameter values. As a specific example, the region A of the target display area 31 and corresponding region C of the client display area 32 can be compressed at a first frame rate based on a first set of parameter values, and the region B of the target display area 31 and corresponding region C of the client display area 32 can be compressed at a second frame rate (different from the first frame rate) based on a second set of parameter values. Accordingly, different streams of images (or portions thereof which can be referred to as region images or as client image portions) can be displayed as regions C and D in the client display area 32.

In some implementations, each of the regions of the moving window session (i.e., regions A and B and respectively corresponding regions C and D) can be associated with an identifier. The identifier can be used to identify the region of the moving window session. For example, region A can be associated with an identifier through which parameter values can be associated. In addition, identifiers associated with regions can be used to associate portions of streamed host images and/or streamed client images with the regions.

In some implementations, the different sets of parameter values can be defined based on movement within images of the stream of images. The analysis of the movement within images of the stream of images can be performed by a stream analysis processor 262 shown in FIG. 2. The stream analysis processor 262 can be configured to determine a frequency of change of pixels within a portion (e.g., within a specified number of frames) of a stream of images transmitted between the host device 250 of the client device 200.

For example, region A of the target display area 31 may include dynamically changing video content that is managed based on the first set of parameter values, which can be tailored to efficient compression of the video content. Specifically, the region A of the target display area 31 can be updated (based on the first of parameter values) at a relatively high frame rate (e.g., frame rate frequency) because of the dynamically changing video content. The stream analysis processor 262 shown in FIG. 2 can be configured identify the region within which the video content is dynamically changing.

In contrast, region B of the target display area 31 may include static text that is managed based on the second set of parameter values, which can be tailored to the relatively static content. Specifically, region B of the target display area 31 can be updated (based on the second set of parameter values) at a relatively low frame rate within the stream of images because the content in region B is static. The stream analysis processor 262 shown in FIG. 2 can be configured identify the region within which content is static.

Figure 4:
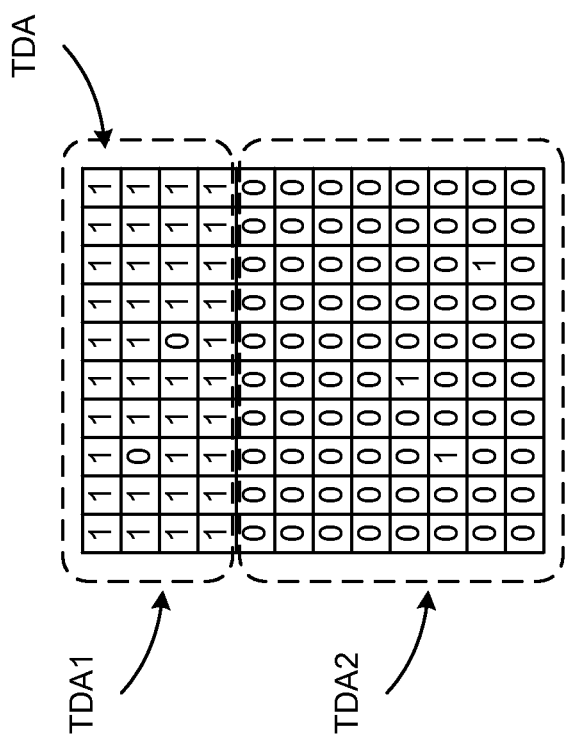
FIG. 4 is a diagram that illustrates pixels that can be designated as static or dynamic.

FIG. 4 is a diagram that illustrates pixels that can be designated as being static or dynamic by, for example, the stream analysis processor 262 shown in FIG. 2. As shown in FIG. 4, dynamic pixels within a target display area TDA are designated with a "1" and static pixels within the target display area are designated with a "0". In some implementations, different types of indicators (e.g., flags) can be used to designate pixels as being static or dynamic. In this implementation, region TDA1 of the target display area TDA can be a first region that includes mostly pixels designated as being dynamic, and region TDA2 of the target display area TDA can be a second region that includes mostly pixels designated as being static. Accordingly, the region TDA1 can be referred to as a dynamic region, and the region TDA2 can be referred to as a static region. In some implementations, pixels can be designated as types other than static or dynamic such as semi-static. As discussed above, each of the regions can be associated with different characteristics (e.g., compression schemes) based on parameter values.

In some implementations, pixels can be designated as dynamic or static based on the number of times each of the pixels changes within a specified number of frames (e.g., two frames, more than two frames) within a stream of images. In some implementations, a pixel can be designated as a dynamic pixel if the pixel has changed from a previous frame, and a pixel can be designated as a static pixel if the pixel has not changed from the previous frame. In some implementations, dynamic pixels can be identified as being dynamic if the pixels have changed more than a threshold number of times over a threshold number of frames. Similarly, static pixels can be identified as being static if the pixels have changed less than a threshold number of times over a threshold number of frames.

As shown in FIG. 4, not all of the pixels included in region TDA1 are designated as being dynamic. In this implementation, the few pixels that are designated as static pixels are grouped with the dynamic pixels because they are only adjacent (e.g., abutting) to other dynamic pixels. Accordingly, pixels can be designated as being part of a static region or a dynamic region based on adjacent pixels or based on pixels that are relatively close by. In some implementations, various threshold conditions such as distance, numbers of pixels, and/or so forth can be used to designate pixels (even if differing from neighboring pixels) as being part of a static region or a dynamic region.

In some implementations, motion vector and residual data (if available) in a compressed stream of images (e.g., a video stream) can be used to identify regions as being static or dynamic. Specifically, when a motion vector of a region is zero and residual data of the region is relatively small, then the region can be designated as a static area. More details related to differences that are encoded (e.g., encoded as motion vectors, residual data) are described in connection with the figures below.

In some implementations, pixels that are designated as static or dynamic can be filtered. As a specific example, after each pixel within a set of pixels is designated as static or dynamic, the stream analysis processor 262 can be configured to filter out noisy pixels that are not designated in a desirable fashion due to either miscalculation or they are indeed isolated from neighboring pixels of the same type. For example, in some implementations, a filtering algorithm implemented by the stream analysis processor 262 can be configured to count number of adjacent (e.g., abutting) pixels with same type. If the count is smaller than a threshold value, the designation of those counted pixels can be changed.

As shown in FIG. 4, regions TDA1 and TDA2 are rectangular regions. In some implementations, the precise shapes or areas of the regions can be defined by a region processor 263. In some implementations, groups of static pixels or dynamic pixels can be grouped into regions that are rectangular or square by, for example, the region processor 263. In some implementations, groups of static pixels or dynamic pixels can be grouped into shapes other than rectangles or squares by, for example, the region processor 263. In some implementations, a target display area can be divided into less than a threshold number of regions, or at least into a specified number of regions, and/or so forth by, for example, the region processor 263.

In some implementations, parameter values associated with a particular region of a target display area can be applied to other regions. For example, a first region identified as being dynamic can be associated with a first set of parameter values tailored to the dynamic nature of the first region. A second region that is also identified as being a dynamic region can be associated with a second set of parameter values tailored to the dynamic nature of the second region. In some implementations, because both the first region and the second region are identified as being dynamic, the first set of parameter values or the second set of parameter values can be applied to both regions. In some implementations, the set of parameter values used for both regions can be based on the set of parameter values that is associated with a region being larger than the other, one of the regions changing at a higher rate than the other, and/or so forth. As a specific example, if the first region changes dynamically at a rate that is higher than that of the second region, the first set of parameter values can be applied to both the first region and the second region.

FIG. 3B illustrates modification of the regions of the moving window session shown in FIG. 3A. As shown in FIG. 3B, the region A of the target display area 31 is decreased in size, and the corresponding region C of the client display area 32 is decreased in size. Also, as shown in FIG. 3B, the region B of the target display area 31 is increased in size, and the corresponding region D of the client display area 32 is increased in size. The regions A and B (and corresponding regions C and D) can be modified based on modification parameter values.

In some implementations, the region A of the target display area 31 shown in FIG. 3A can be associated with an identifier included in a set of initialization parameter values (which define characteristics of the region A). The identifier can be used to send portions of host images (e.g., host image 30) included within the region A of the target display area 31 to the corresponding region C. The region A shown in FIG. 3B can be modified from the region A shown in FIG. 3A by associating a set of modification parameter values with the identifier of region A. Region B can be handled in a similar fashion.

Alternatively, in some implementations, the region A shown in FIG. 3A can be defined by a set of initialization parameter values. The region A shown in FIG. 3B can be modified from the region A shown in FIG. 3A by associating a set of modification parameter values with the identifier of region A.

The region A can be changed from that shown in FIG. 3A to that shown in FIG. 3B in response to, for example, changes in content streamed within (e.g., streamed into) region A of the target display area 31. For example, region A can be associated with a set of initialization parameter values configured for compression of video content within region A. A decrease in the area of the video content can result in the decrease in the size of region a based on the modification parameter values.

FIG. 3C illustrates modification of the regions of the moving window session shown in FIG. 3A. As shown in FIG. 3C, the region E is added to the target display area 31, and a corresponding region F is included in the client display area 32. As shown in FIG. 3C, with addition of region E (and corresponding region F) the regions A and B of the target display area 31 are decreased in size, and the respectively corresponding regions C and D of the client display area 32 are also decreased in size. The region E can be added to the regions A and B shown in FIG. 3A in response to, for example, changes in content streamed within (e.g., streamed into) target display area 31. Accordingly, different streams of images (or portions thereof which can be referred to as region images or as client image portions) can be displayed in regions C, D, and F of the client display area 32.

FIG. 3D illustrates modification of the regions of the moving window session shown in FIG. 3A. As shown in FIG. 3D, the region A is removed from the target display area 31, and a corresponding region C is also removed from the client display area 32. As shown in FIG. 3D, with addition of region E (and corresponding region F) the regions A and B of the target display area 31 are decreased in size, and the respectively corresponding regions C and D of the client display area 32 are also decreased in size. The region E can be added to the regions A and B shown in FIG. 3A in response to, for example, changes in content streamed within (e.g., streamed into) target display area 31.

The characteristics of each of the regions of the moving window session can be dynamically modified during a single (or continuous) moving window session (e.g., single client-host session including a moving window session, single remote desktop session). In other words, one or more regions of the moving window session can, after being initiated, be modified without terminating and restarting a moving window session.

Referring back to FIG. 2, in some implementations, the client parameter value handler 212 and the host parameter value handler 217 can be configured to exchange parameter values related to initialization or modification of host display area 23 (or a region thereof). Specifically, the host parameter value handler 217 can be configured to send parameter values related to initialization or modification of the host display area 23 to the client parameter value handler 212. In some implementations, parameter values related to the host display area 23 can be requested from the host parameter value handler 217 by the client parameter value handler 212. For example, the host parameter value handler 217 can be configured to send a parameter value (e.g., an initialization parameter value, a modification parameter value) of dimensions (e.g., a size, an area, an aspect ratio, height/width values), resolution, compression scheme, and/or so forth of the host display area 23. In some implementations, the host parameter value handler 217 can be configured to send parameter values about a grid size, a coordinate system, an origin, compression scheme, and/or so forth of the host display area 23 to be used when specifying movement of the target display area 21 within the host display area 23.

In some implementations, the client parameter value handler 212 can be configured to send a parameter value (e.g., an initialization parameter value, a modification parameter value) of dimensions (e.g., a size, an aspect ratio, an area, height/width values), resolution, compression scheme, and/ or so forth of the target display area 21 for initialization and/or modification of the target display area 21. In some implementations, parameter values about the target display area 21 can be requested from the client parameter value handler 212 by the host parameter value handler 217. In some implementations, the dimensions of the target display area 21 can be relative to the dimensions of the host display area 23. For example, the target display area 21 can be defined as a percentage of an area of the host display area 23. Accordingly, the target display area 21 can be defined based on parameter values about the host display area 23.

In some implementations, the client parameter value handler 212 and the host parameter value handler 217 can be configured to exchange parameter values (e.g., an initialization parameter value, a modification parameter value), such as dimensions (e.g., a size, an area, an aspect ratio, height/width values), resolution, compression scheme, and/or so forth of the display 211 of the client device 200 to the host parameter value handler 217. In some implementations, parameter values (e.g., an initialization parameter value, a modification parameter value) related to the display 211 can be referred to as to display values. The display values can be used by the host parameter value handler 217 to define a size of the target display area 21 within the host display area 23. In some implementations, the target display area 21 can have an area (e.g., dimensions) and/or resolution that are different than those of the display 211.

In some implementations, the client parameter value handler 212 and the host parameter value handler 217 can be configured to exchange parameter values (e.g., an initialization parameter value, a modification parameter value) related to codecs to be used during a moving window session (associated with a client-host session). For example, the host parameter value handler 217 can be configured to send a parameter value (e.g., an initialization parameter value, a modification parameter value) identifying an encoding algorithm (also can be referred to as an encode parameter value) to be used by the encoder 286 to encode images during a moving window session. The client parameter value handler 212 can be configured to acknowledge the encoding algorithm, and can be configured to trigger the decoder 272 to compatibly decode images based on the encoding algorithm during the moving window session (associated with the client-host session). As another example, the client parameter value handler 212 can be configured to send a parameter value identifying a decoding algorithm (also can be referred to as a decode parameter value) to be used by the decoder 272 to decode images during a moving window session (associated with a client-host session). The host parameter value handler 217 can be configured to acknowledge the decoding algorithm, and can be configured to trigger the encoder 286 to encode images compatibly with the decoding algorithm during the moving window session.

In some implementations, regions associated with the target display area 21 can be modified with movement of the target display area 21. In some implementations, the regions can be statically defined within the target display area 21 even with movement of the target display area 21.

An example of client images produced based on host images are illustrated in FIGS. 5A through 5H. Specifically, FIGS. 5A, 5C, 5E, and 5G illustrate host images, and FIGS. 5B, 5D, 5F, and 5H illustrate client images produced, respectively, based on a target display area 51 within a host display area 53 of the host images. In this implementation, the target display area 51 is associated with regions having different characteristics defined within parameter values associated with each of the regions.

Figure 5A:
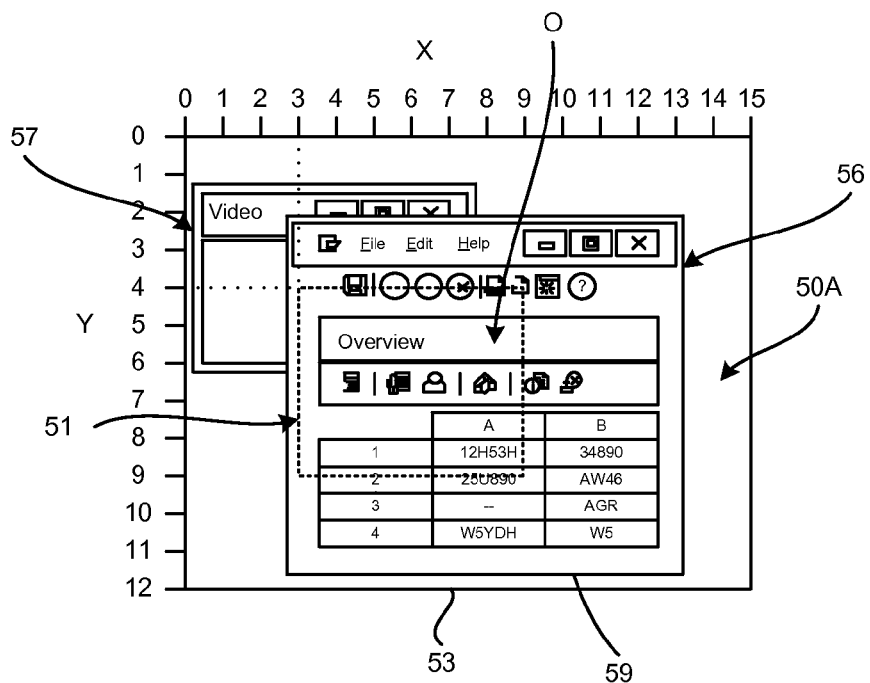
FIGS. 5A through 5H illustrate client images produced based on host images.

FIG. 5A is a diagram that illustrates the target display area 51 within the host display area 53 of a host image 50A. As shown in FIG. 5A, the target display area 51 is at an x-y position (e.g., x-y coordinates) of (3,4) with respect to an origin of (0,0) at an upper-left corner of the host display area 53. In some implementations, the x-y position of coordinates used to define a position of the target display area 51 within the host display area 53 can be referred to as an offset, as a target offset, or as target coordinates. As shown in FIG. 5A, the host image 50A includes at least a portion of a user interface 56 and a user interface 57 associated with one or more applications. The user interface 56 is associated with relatively static content and the user interface 57 is associated with relatively dynamic video content. In some implementations, the host image 50A can be produced by a host image generator such as host image generator 282 shown in FIG. 2.

Although the origin of the host display area 53 shown in FIG. 5A is at the upper-left corner of the host display area 53, in some implementations, the origin can be in a different location. For example, an origin of a host display area can be in the bottom-right corner of the host display area, in a middle portion of the host display area, and/or so forth. Also, as shown in FIG. 5A, the target display area 51 has a position based on an upper-left corner of the target display area 51. Although not shown in FIG. 5A, in some implementations, the target display area 51 can have a position based on a different portion of the target display area 51. For example, the target display area 51 can have a position based on a bottom-right corner of the target display area 51, a middle portion of the target display area 51, and/or so forth.

Figure 5B:
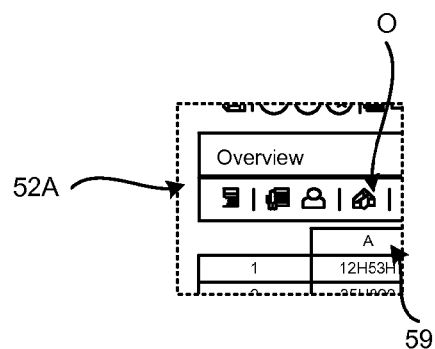

FIG. 5B illustrates a client image 52A produced based on the position of the target display area 51. The client image 52A corresponds with the target display area 51 within the host image 50A. As shown in FIG. 5A, the target display area 51 has a width of approximately 6 units (e.g., grid increments, coordinate increments) (between 4 and 9 on the x axis), and a height of approximately 5 units (between 4 and 9 on the y axis). Accordingly, the client image 52A shown in FIG. 5B also has a width of approximately 6 units and a height of approximately 5 units.

Although not shown in FIGS. 5A through 5H, an updated client image can be produced based on changes triggered by an application without an input triggered by a user. For example, an application playing a video can produce a stream of host images that are updated as the video proceeds within the user interface 57. Accordingly, client images produced based on the stream of host images will also be updated as the host images within the stream of host images are updated. In some implementations, the client image 52A can be produced by a client image generator such as client image generator 284 shown in FIG. 2.

In some implementations, the refresh rate associated with the target display area 51 can be relatively low because the target display area 51 includes content of the relatively static user interface 56. In some implementations, the refresh rate (e.g., refresh frequency) can be defined within one or more parameter values associated with the target display area 51. As shown in FIGS. 5A and 5B, the target display area 51 is associated with a single region O. In some implementations, one or more characteristics of the region O is defined by one or more parameter values can be tailored to the relatively static content of the user interface 56.

Referring back to FIG. 2, the client display module 210 includes a client input device module 240 configured to produce one or more input values based on interactions with the client image 22 using the input device 242. The input values produced by the client input device module 240 can be sent (via the moving window session) to the host device 250.

Specifically, the input values produced by the client input device module 240 can be received by the host input device module 255.

For example, the client input device module 240 can be configured to produce an input value representing movement of a position of a cursor related to, clicking of, etc. of a mouse device (which can be a type of input device 242). The client input device module 240 can be configured to produce an input value representing a selection of a portion of the client image 22 (e.g., selection of a hyperlink, selection of a portion of a user interface represented within the client image 22) using the input device 242. In some implementations, the client input device module 240 can be configured to produce an input value related to data input into (e.g., inserted into, populated within) one or more fields represented within the client image 22, for example, by a keyboard device (which can be a type of input device 242).

In some implementations, a position (e.g., coordinates) of a cursor, a selection, and/or so forth within the client image 22 can be used by the client input device module 240 and/or the host input device module 255 to calculate (e.g., determine, identify) a position (e.g., coordinates) with respect to the host display area 23. For example, a position (e.g., an offset with respect to an origin) of a cursor within the client image 22 can be used in conjunction with a position (e.g., an offset with respect to an origin) of the client image 22 within the host display area 23 to calculate (e.g., derive) a position of the cursor within the host display area 23. In some implementations, the client input device module 240 can be configured to use the position information (e.g., the position of the cursor within the client image 22 and the position of the client image 22 within the host display area 23) to calculate the position of the cursor within the host display area 23. Alternatively, the host input device module 255 can be configured to calculate the position of the cursor within the host display area 23 based on the position information (e.g., the position of the cursor within the client image 22 and the position of the client image 22 within the host display area 23). In some implementations, information about position of the cursor within the client image 22 can be sent to the host input device module 255 so that the host input device module 255 can calculate the position of the cursor within the host display area 23.

In some implementations, the client image 22 displayed within the display 211 can be modified (e.g., replaced, updated) in response to an input value. For example, a user interface element associated with a function of the application 26 represented within the client image 22 can be selected using the input device 242. The client input device module 240 can define an input value representing selection of the user interface element associated with the function. The input value can be received by the host input device module 255, and can be used to trigger a function of the application 26 (and/or another application operating at the host device 250). Execution of the function of the application 26 can result in a modification (e.g., an update) to the host image 20 performed by the host image generator 282. The modification to the host image 20 can be reflected in a modified version of the client image 22 produced by the client image generator 284 based on the position of the target display area 21 within the host image 20. The modified version of the client image 22 can be sent to and received by the client image processor 277, and displayed within the display 211 of the client device 200. Accordingly, the client image 22 displayed within the display 211 can be modified (e.g., replaced, updated) in response to an input value.

In some implementations, the display 211 can function as an input device (e.g., input device 242). In such implementations, the display 211 can be, for example, a touch sensitive display that can be, or can include, for example, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If the display 211 is, for example, a touch sensitive device, one or more input values can be produced by the client input device module 240 based on physical interactions of a user with the display 211. For example, the display 211 can be configured to display a virtual keyboard (e.g., emulate a keyboard) that can be used by a user as an input device.

Figure 5C:
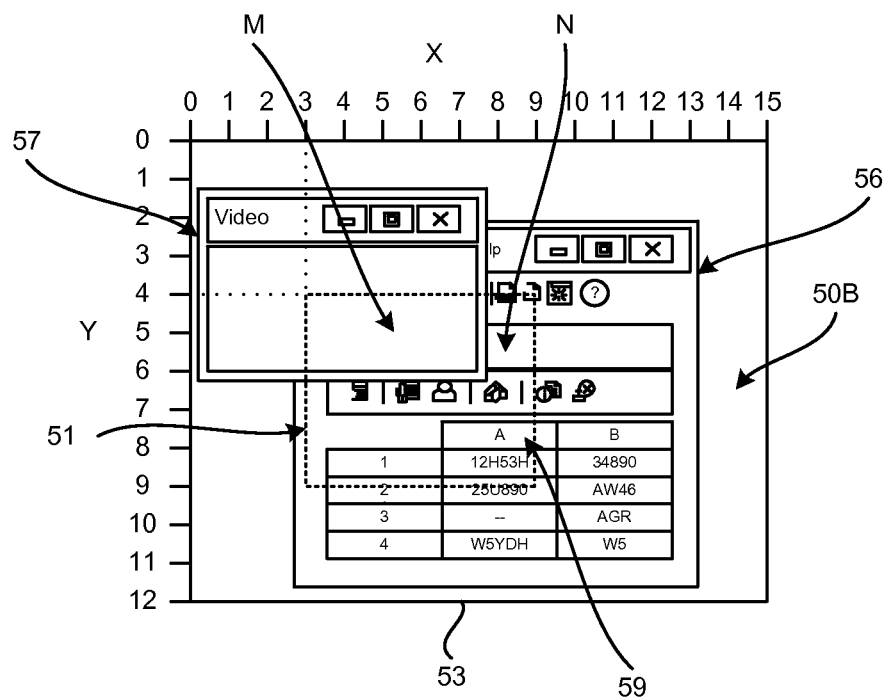
Figure 5D:
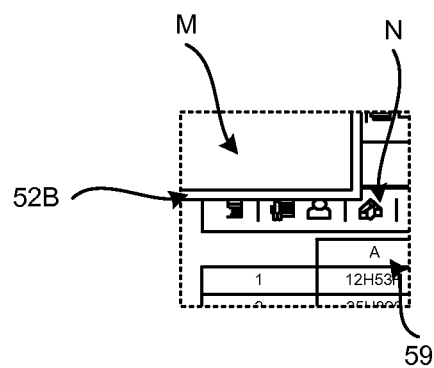

FIG. 5C illustrates a host image 50B that is modified relative to the host image 50A shown in FIG. 5A in response to input from a user. The host image 50B shown in FIG. 5C can be an image that is produced after the host image 50A shown in FIG. 5A. FIG. 5D illustrates a client image 52B produced based on the position of the target display area 51. The client image 52B corresponds with the target display area 51 within the host image 50B.

In this implementation, the user interface 57 is moved to a layered position on top of the user interface 56. Even though the refresh rate within the target display area 51 could be relatively slow as discussed in connection with FIG. 5A, the movement of the user interface 57 to a position on top the user interface 56 can trigger a refresh of content included in the target display area 51. Accordingly, the change in the layered position of the user interface 57 with respect to the user interface 56 can be an asynchronous event (e.g., an asynchronous event triggered by a user) that triggers refreshing within the target display area 51. In some implementations, refreshing of the portion of the target display area 51 can be requested by the client device (e.g., client device 200 shown in FIG. 2) in response to an asynchronous event such as an input from a user. The asynchronous event can override a refresh rate specified within one or more parameter values.

Region O, which shown in FIG. 5A, is divided into two regions M and N that are shown in FIG. 5C. The region M is associated with the user interface 57 (which is a video content user interface) and region N is associated with the user interface 56. Each of the regions M and N can be associated with different characteristics (e.g., codecs, refresh rates, etc.) as defined within different sets of parameter values. In some implementations, because the region M is associated with a user interface including video content, the region M can be defined as a region that refreshes at a rate that is faster than a refresh rate of the region N, which includes relatively static content. The regions M and N can be defined by parameter values that can be different than, or the same as, one or more of the parameter values defining the characteristics of region O shown in FIG. 5A. Accordingly, different streams of images (or portions thereof which can be referred to as region images or as client image portions) can be associated with regions M and N and used to produce client images displayed in the client display area 24.

As shown in FIGS. 5C and 5D, the area (e.g., size) of the region M and the area of the region N are different. In some implementations, coordinates used to identify the area (e.g., origin, size) of the region M and coordinates used to identify the origin of the region N shown in FIGS. 5C and 5D can be specified within one or more parameter values.

In some implementations, sending of content associated with region O from a host device (e.g., host device 250 shown in FIG. 2) can be terminated in response to a request from a client device (e.g., client parameter value handler 212 of the client device 200 shown in FIG. 2) so that content associated with the new regions M and N can proceed. In some implementations, termination of the sending of content associated with region O can be acknowledged between the host device and client device. In some implementations regions M and N can be dynamically modified by modification parameter values.

Figure 5E:
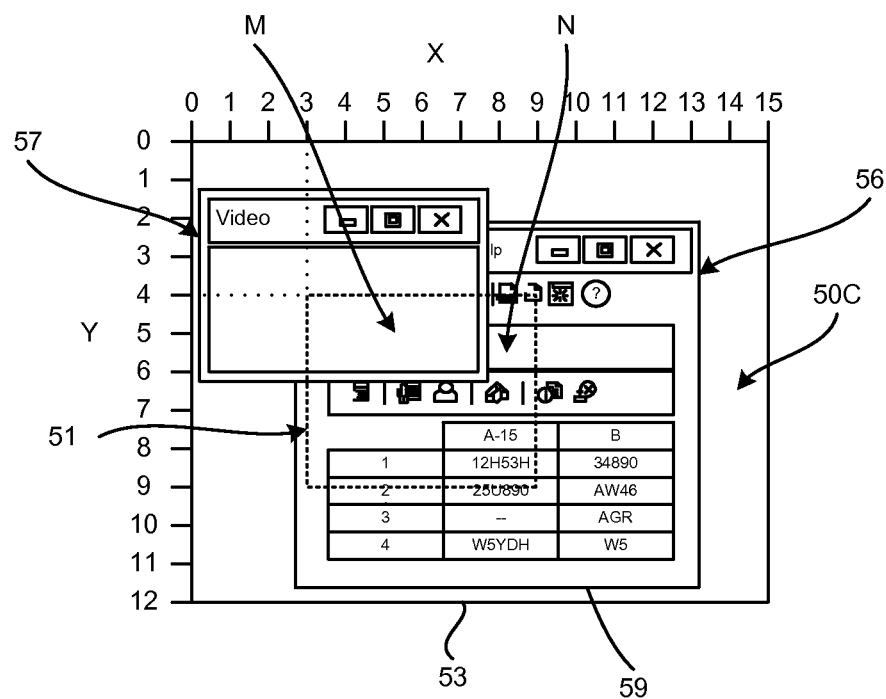

FIG. 5E illustrates a host image 50C that is modified relative to the host image 50A shown in FIG. 5A in response to input from a user. The host image 50C shown in FIG. 5E can be an image that is produced after the host image 50B shown in FIG. 5C. Specifically, a field 59, which included the letter "A" in host image 50B shown in FIG. 5B, is modified via an input device (e.g., the input device 242 shown in FIG. 2) to include the text "A-15" as shown in FIG. 5E. In some implementations, the host image 50C can be produced in response to the modification of the field 59 represented within the host image 50A. In some embodiments, the modification of the text included in region N can be an asynchronous event that triggers a refresh.

Figure 5F:
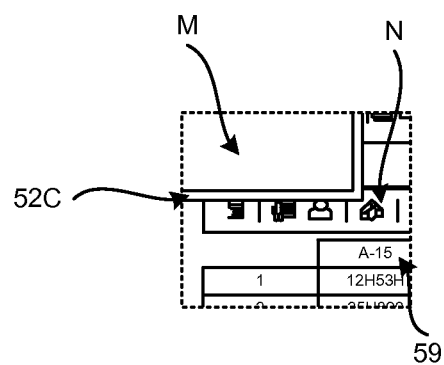

Because the field 59, in this implementation, is included in the target display area 51, the updated field 59 is included in client image 52C shown in FIG. 5F, which is produced based on the target display area 51 within the host image 50C shown in FIG. 5E. Also, the change in the layering of the user interface 56 and the user interface 57 are reflected in the host image 50C. Thus, the updated field 59 in the host image 50C can be displayed at a client device via the client image 52C.

Referring back to FIG. 2, the client device 200 and the host device 250 each include a movement module. Specifically, the client display module 210 includes a client target movement module 235, and the host display module 215 includes a host target movement module 245. The client target movement module 235 is configured to trigger movement of the target display area 21 within the host display area 23 via the host target movement module 245. For example, the client target movement module 235 can be configured to define an indicator configured to trigger movement of the target display area 21. The indicator can be sent (via a moving window session) from the client target movement module 235 to the host target movement module 245. The host target movement module 245 can be configured to trigger movement of the target display area 21 at the host device 250 within the host display area 23 based on the indicator.

In some implementations, the indicator can be, or can include, coordinates (which can be restored to as target coordinates) specifying a position of the target display area 21 within the host display area 23. In some implementations, the indicator can be, or can include, an offset from a prior position of the target display area 21 within the host display area 23 to a new position of the target display area 21 within the host display area 23. In some implementations, the indicator can be, or can include, a vector specifying a direction and magnitude of the change in a position of the target display area 21 within the host display area 23.

In some implementations, movement of the target display area 21 within the host display area 23 can be triggered using one or more input devices. For example, movement of the target display area 21 can be triggered by a mouse device and/or a keyboard device (which can be types of the input device 242). In some implementations, movement of the target display area 21 can be triggered using a touch sensitive portion of the display 211.

Figure 5G:
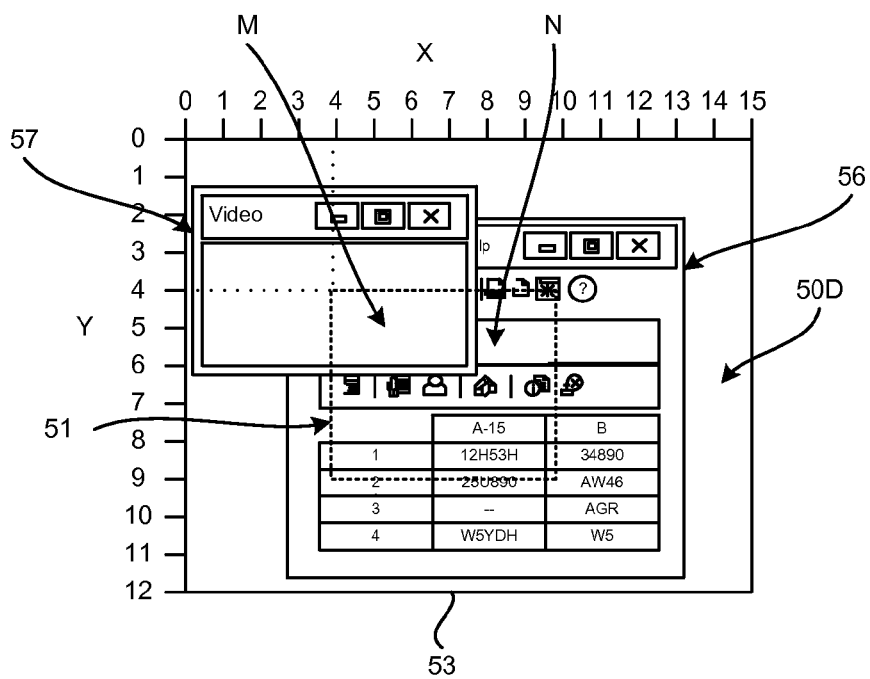

Movement of a target display area within a host display area is illustrated in connection with FIGS. 5G through 5H. FIG. 5G illustrates the target display area 51 moved to the right to a position at target coordinates (4,4) within the host display area 53 of the host image 50D from a position at target coordinates (3,4) shown in FIG. 5E. In some implementations, the target display area 51 can be moved in response to an input from a user (via the client target movement module 235 and the host target movement module 245 shown in FIG. 2). In this implementation, the target display area 51 is moved within the host display area 53 without a change in the host image 50D. Specifically, the host image 50D shown in FIG. 5G is the same as the host image 50D shown in FIG. 5E. In some implementations, the target display area 51 can be moved within the host display area 53 with (e.g., coincident with) a change in a host image associated with the host display area 53.

Figure 5H:
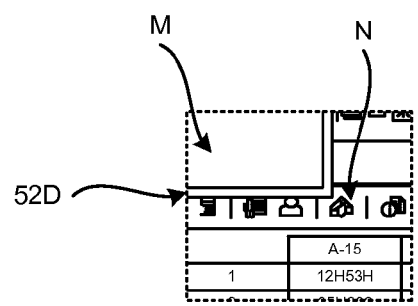

FIG. 5H illustrates a client image 52D that corresponds with the position of the target display area 51 shown in FIG. 5G. Accordingly, the client image 52D can be an image displayed at a client device after movement of the target display area 51 within the host display area 53. In some implementations, the client image 52D can be produced by the client image generator 284, and received by the client image processor 277 shown in FIG. 2.

As shown in FIGS. 5G and 5H, with the movement of the target display area 51, the area (e.g., size) of the region M and the area of the region N are modified. Specifically, the area of the region M is decreased, and the area of the region N is increased. Coordinates used to identify the area (e.g., origin) of the region M and coordinates used to identify the origin of the region N shown in FIGS. 5G and 5H can be different than, for example, the coordinates used to identify the area of the region M and coordinates used to identify the origin of the region N shown in FIGS. 5E and 5F. In some implementations, changes to the regions M and N can be implemented using one or more modification parameter values.

Referring back to FIG. 2, in some implementations, parameter values related to establishment of the moving window session between the client device 200 and the host device 250 can be based on one or more default parameter values (e.g., default settings). For example, the client connection module 230 can be configured to define and send a default initial position value(s) (e.g., an initial location, an initial offset) for the target display area 21 to the host connection module 237, or vice versa.

In some implementations, one or more parameter values related to initialization and/or modification can be used to determine, for example, a position of cursor, selection, and/or so forth triggered by an input device (e.g., a cursor device, a mouse device, a touchscreen device) in the host display area. For example, a parameter value identifying an origin with respect to the host display area 23 can be used to identify or define coordinates related to a cursor triggered by an input device.

Figure 6:
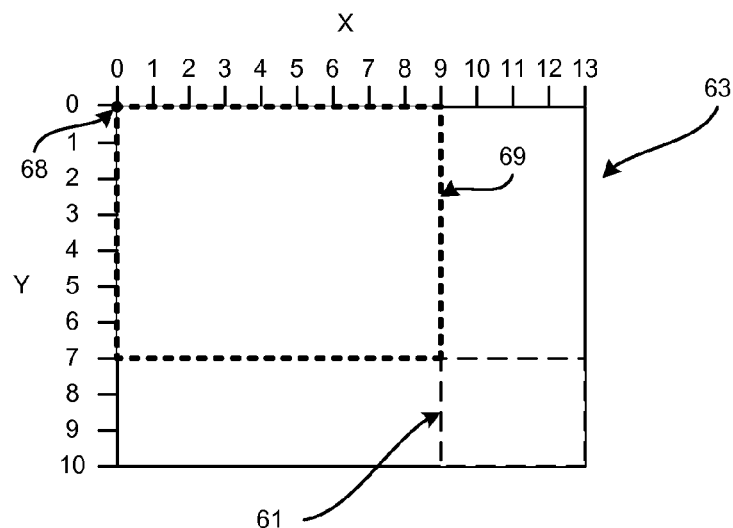
FIG. 6 is a diagram that illustrates an example of an offset boundary within a host display area and related to a target display area.

FIG. 6 is a diagram that illustrates an example of an offset boundary 69 within a host display area 63 and related to a target display area 61 (or a region thereof). As shown in FIG. 6, an origin of the host display area 63 is at x-y coordinates (0,0) (represented by reference numeral 68) and the host display area 63 has a width of 13, and a height of 10.

In this implementation, a position of the target display area 61 within the host display area 63 is based on a position of an upper-left corner of the target display area 61 and coordinates with respect to the origin 68 of the host display area 63. As mentioned above, coordinates that are used to define a position of the target display area 61 (or a region thereof) within the host display area 63 can be referred to as target coordinates. For example, the target display area 61 (or a region thereof), as shown in FIG. 6, is located at target coordinates (9,7).

As shown in FIG. 6, the offset boundary 69 (illustrated by a dashed rectangle) is defined by offset boundary values that can include coordinates with an x-value between 0 and 9 (which can be referred to as a maximum horizontal width) and with a y-value between 0 and 7 (which can be referred to as a maximum vertical height). The offset boundary 69 defines a boundary (e.g., a vertical boundary, horizontal boundary) of target coordinates for the target display area 61 (or a region thereof). In some implementations, the offset boundary 69 can be defined by offset boundary values that are different than x-y coordinates (e.g., perimeter values, etc.).

In this implementation, the offset boundary 69 is defined so that the target display area 61 may only be positioned with respect to the host display area 63 based on coordinates that fall within the offset boundary 69. As shown in FIG. 6, the location of the target display area 61 (or a region thereof) with coordinates (9,7) falls within the offset boundary 69.

In this implementation, the offset boundary 69 is defined so that the target display area 61 will be included within the host display area 63 so long as target coordinates associated with the target display area 61 are included in the offset boundary 69. For example, if the target display area 61 is located at target coordinates (0,7) (which are coordinates included in the offset boundary 69), the target display area 61 will be included in the host display area 63.

Figure 7:
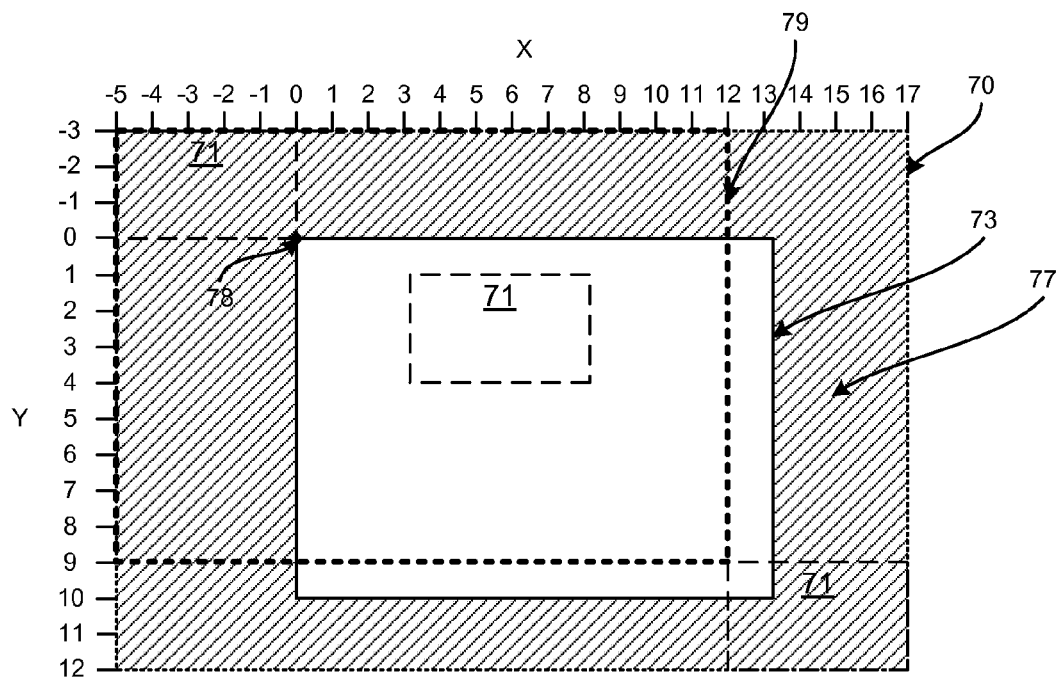
FIG. 7 is a diagram that illustrates an example of another offset boundary associated with a host display area and related to a target display area.

FIG. 7 is a diagram that illustrates an example of another offset boundary 79 associated with a host display area 73 and related to a target display area 71 (or a region thereof). As shown in FIG. 7, an origin of the host display area 73 is at x-y coordinates (0,0) (represented by reference numeral 78) and the host display area 73 has a width of 13, and a height of 10 (as illustrated by the x-y coordinates).

In this implementation, a position of the target display area 71 within the host display area 73 is based on a position of an upper-left corner of the target display area 71 (or a region thereof) and coordinates with respect to the origin 78 of the host display area 73. As mentioned above, coordinates that are used to define a position of the target display area 71 within the host display area 73 can be referred to as target coordinates. In this implementation, the target display area 71 (or a region thereof) is illustrated at several different target coordinates. For example, the target display area 71 (or a region thereof) is illustrated at target coordinates (−5,−3), is illustrated at target coordinates (12,9), and is also illustrated at target coordinates (3,1). Although not explicitly identified, the target display area 71 (or a region thereof) can be located at these different (e.g., distinct) target coordinates during different (e.g., mutually exclusive) time slices.

As shown in FIG. 7, the offset boundary 79 (illustrated by a dashed rectangle) is defined by offset boundary values that can include coordinates with an x-value between −5 and 12 (which can be referred to as a maximum horizontal width) and with a y-value between −3 and 9 (which can be referred to as a maximum vertical height). The offset boundary 79 defines a boundary (e.g., a vertical boundary, a horizontal boundary) of target coordinates for the target display area 71 (or a region thereof). In some implementations, the offset boundary 79 can be defined by offset boundary values that are different than x-y coordinates (e.g., perimeter values, etc.). In some implementations, the offset boundary 79 can be defined different than shown in FIG. 7. For example, the offset boundary 79 can be defined so that target display area 71 (or a region thereof) can be moved entirely outside of the host display area 73 on the right side (with a maximum offset boundary value of 13).

In this implementation, the offset boundary 79 is defined so that in some instances the target display area 71 (or a region thereof) can be positioned outside of the host display area 73 based on coordinates that fall within the offset boundary 79. Accordingly, the target display area 71 (or a region thereof) can have an area that is moved within a boundary 70 that includes area 77 (illustrated by slanted lines) and the host display area 73. In some implementations, the area 77 can include, for example, a background image (e.g., a black background image, a white background image), a customized image, and/or so forth. In some implementations, the boundary 70 can be referred to as a boundary of movement of the target display area 71 (or a region thereof).

As shown in FIG. 7, the location of the target display area 71 (or a region thereof) with target coordinates (−5,−3) falls within the offset boundary 79, but is entirely outside of the host display area 73. When the target display area 71 (or a region thereof) is located at target coordinates (−5,−3), a client image corresponding with the target display area 71 can be defined based on an image of at least a portion of area 77. When the location of the target display area 71 is at target coordinates (3,1) within the offset boundary 79, the target display area 71 is entirely inside of the host display area 73. In such instances, a client image associated with the target display area 71 at the target coordinates (3,1) can be based on a host image of the target display area 71. Finally, when the location of the target display area 71 (or a region thereof) is at target coordinates (12,9) within the offset boundary 79, a portion of the target display area 71 (or a region thereof) is inside of the host display area 73 and a portion of the target display area 71 (or a region thereof) is outside of the host display area 73. In such instances, a client image associated with the target display area 71 (or a region thereof) at the target coordinates (12,9) can be based on a combination of a host image (or a portion thereof) of the target display area 71 and an image of at least a portion of the area 77.

In some implementations, a client image can be defined so that as many visible pixels as possible from the host display area 73 can be sent to a client device when part of the target display area 71 (or a region thereof) is outside the host display area 73. In this use case, a user can use, for example, a scrollbar to control a position of the target display area 71 (or a region thereof). In this scenario, the range of offset can be calculated based on the following:

offset_x_min=0;

offset_x_max=max(0,host_display_area_width−target_display_area_width);

offset_y_min=0;

offset_y_max=max(0 host_display_area_height−target_display_area_height);

When the requested target offset coordinates are outside of this range, the target coordinates of the target display area 71 (or a region thereof) can be adjusted according to the following:

visible_offset_x=min(max(offset_x,offset_x_min), offset_x_max);

visible_offset_y=min(max(offset_y,offset_y_min), offset_y_max);

Then the size (e.g., dimensions) of visible area (e.g., client image) within the target display area 71 (or a region thereof) can be calculated as:

visible_width=min(target_display_area_width,host_display_area_width−visible_offset_x);

visible_height=min(target_display_area_height,host_display_area_height−visible_offset_y).

In some implementations, the requested target coordinates can be given priority. In this scenario, the visible area size of the host display area 73 can be determined based on requested target offset coordinates. The visible area size can vary, especially when the requested target offset coordinates are close to the border of the host display area 73. In this use case a user can use, for example, a scrollbar to control a position of the target display area 71 (or a region thereof). In this scenario, the range of offset can be unlimited and can be based on the following:

$$\text{visible\_offset\_}x = \min(\max(\text{offset\_}x, 0), \text{host\_display\_area\_width});$$

$$\text{visible\_offset\_}y = \min(\max(\text{offset\_}y, 0), \text{host\_display\_area\_height});$$

Then the size (e.g., dimensions) of visible area (e.g., client image) can be calculated as:

$$\text{visible\_right} = \min(\max(\text{offset\_}x + \text{target\_display\_area\_width}, 0), \text{host\_display\_area\_width});$$

$$\text{visible\_bottom} = \min(\max(\text{offset\_}y + \text{target\_display\_area\_height}, 0), \text{host\_display\_area\_height});$$

$$\text{visible\_width} = \max(\text{visible\_right} - \text{visible\_offset\_}x, 0);$$

$$\text{visible\_height} = \max(\text{visible\_bottom} - \text{visible\_offset\_}y, 0);$$

After the visible area has been calculated, the host device can encode the pixel data in visible area as a series of client images (e.g., a video frame sequence) and can transmit them to client device. In some implementations, an anchor frame or anchor client image (which can be a first image) of the series of client images can be associated with (e.g., can include) the information about the visible area (visible_offset_x, visible_offset_y, visible_width and visible_height). In some implementations, one or more of the formulas (e.g., algorithms) described above can be defined within, or can be selected within, initialization parameters (e.g., initialization parameters associated with offset boundaries) exchanged during establishment of a moving window session.

In some implementations, values related to, for example, an offset boundary, an initial position, and/or so forth can be included in a boundary preference. Referring back to FIG. 2, a boundary preference 18 can be stored in a client memory 220 of the client display module 210. Accordingly, values defining the boundary preference 18 can be exchanged during the exchange of initialization parameter values (which can occur during establishment of a moving window session).

In some implementations, a target display area, a host display area, an offset boundary, and/or so forth may have a shape different than a square or a rectangle. In some implementations, a target display area, a host display area, an offset boundary, and so forth can have a circular shape, a curved shape, a triangular or other polygon shape, and/or so forth.

Figure 8:
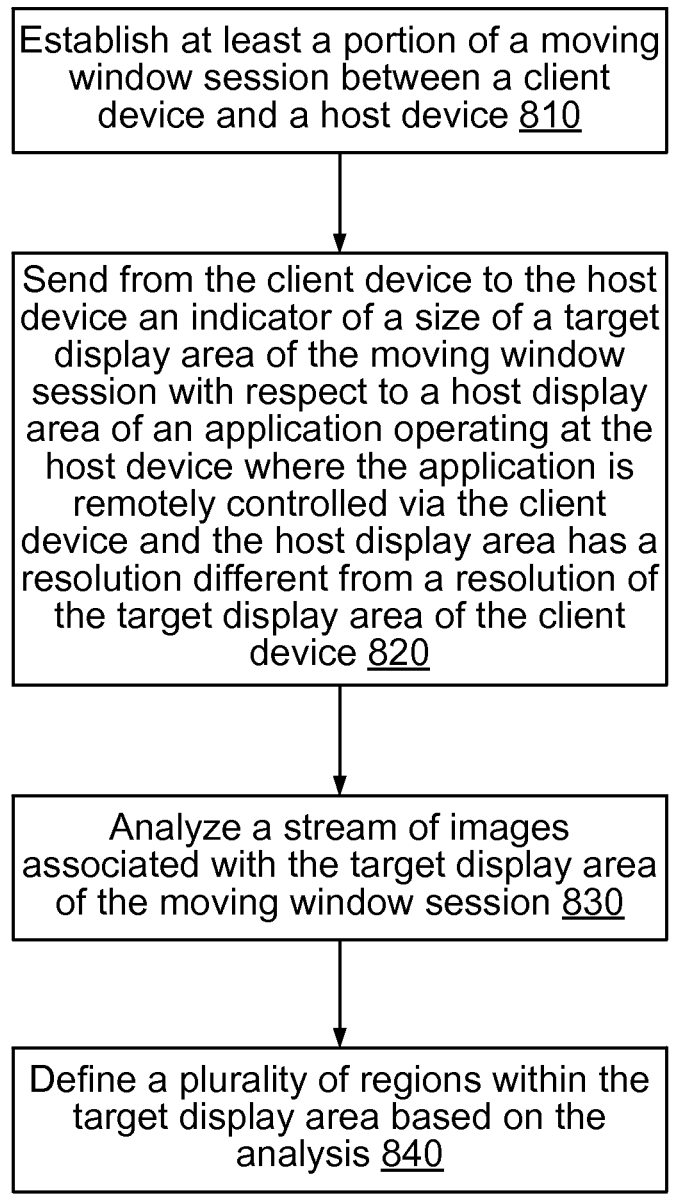
FIG. 8 is a flowchart that illustrates a method for defining regions of a target display area, according to implementation.

FIG. 8 is a flowchart that illustrates a method for defining regions of a target display area, according to implementation. At least some portions of the flowchart can be performed by a client device and/or a host device such as those shown in FIG. 2.

As shown in FIG. 8, at least a portion of a moving window session between a client device and a host device can be established (block 810). The moving window session can be established at least in part by the client connection module 230 and host connection module 237 shown in FIG. 2. In some implementations, initialization parameter values can be exchanged between the client device and the host device during establishment of the moving window session.

An indicator of a size of a target display area of the moving window session with respect to a host display area of an application operating at the host device is sent from the client device to the host device where the application is remotely controlled via the client device and the host display area has a resolution different from a resolution of the target display area of the client device (block 820). In some implementations, the indicator of the size of the target display area can be included as an initialization parameter value defined by the client parameter values handler 212 shown in FIG. 2. In some implementations, the indicator can be received by the host parameter value handler 217 shown in FIG. 2.

A stream of images associated with the target display area of the moving window session is analyzed (block 830). In some implementations, the stream of images can be analyzed by the stream analysis processor 262 shown in FIG. 2. In some implementations, static regions of the stream of images and/or dynamic regions of the stream of images can be identified by the stream analysis processor 262.

A plurality of regions within the target display area can be defined based on the analysis (block 840). In some implementations, the plurality of regions can be defined by the region processor 263 shown in FIG. 2. In some implementations, the plurality of regions can include multiple regions that are associated with different parameter values. In some implementations, one or more of the plurality of regions can be read defined using modification parameter values that are different than initialization parameter values.

Figure 9:
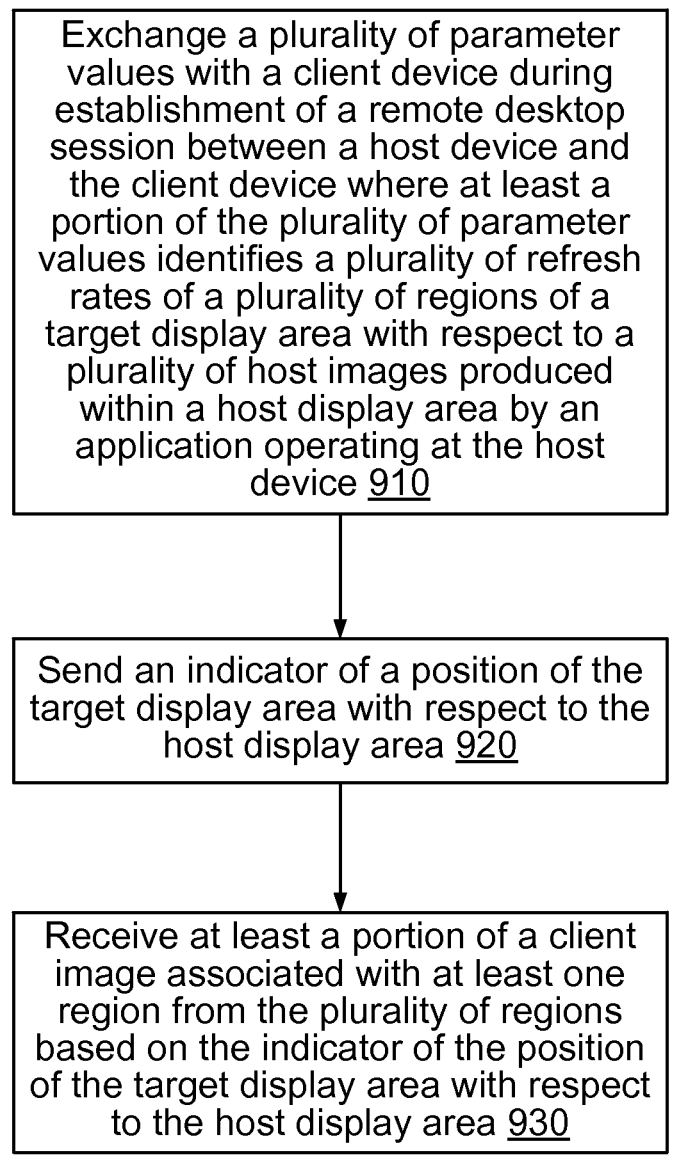
FIG. 9 is a flowchart that illustrates a method for defining regions of a target display area, according to implementation.

FIG. 9 is a flowchart that illustrates a method for defining regions of a target display area, according to implementation. At least some portions of the flowchart can be performed by a client device and/or a host device such as those shown in FIG. 2.

A plurality of parameter values are exchanged with a client device during establishment of a remote desktop session between a host device and the client device where at least a portion of the plurality of parameter values identifying a plurality of refresh rates of a plurality of regions of a target display area with respect to a plurality of host images produced within a host display area by an application operating at the host device (block 910). In some implementations, the plurality of parameter values can be exchanged between the client connection module 230 and the host connection module 237 shown in FIG. 2. In some implementations at least a portion of the plurality of parameter values can be defined by the client parameter value handler 212 and/or the host parameter value handler 217 shown in FIG. 2.

An indicator of a position of the target display area with respect to the host display area is sent (block 920). The indicator of the position can be produced by the client target movement module 235 shown in FIG. 2.

At least a portion of a client image associated with at least one region from the plurality of regions is received based on the indicator of the position of the target display area with respect to the host display area (block 930). In some implementations, the portion of the client image can be received at the image receiver 270 shown in FIG. 2. In some implementations, the portion of the client image can be processed based on a transition image. In some implementations, multiple portions can be received and constructed into the client image, which can be displayed in a client image area.

Referring back to FIG. 2, in some implementations, a position of a cursor (which can be an input value associated with an input device) with respect to a client image, a target display area, the host image, a host display area (e.g., within the host display area outside of the client image), and/or so forth, can be calculated (e.g., determined) at the client device 200 and/ or at the host device 250. In some implementations, the position of the cursor can be defined with respect to an origin of the host display area (and/or host image), an origin of a target display area (and/or client image), and/or so forth. The position of the cursor can be defined so that movements of the cursor can be calculated at the client device 200 and/or at the host device 250.

For example, a position of a cursor (within a host display area, a client image) can be determined at the client device 200 based on an indicator of an origin associated with the host display area received at the client device from the host device 250. The position of the cursor based on coordinates associated with the host display area can then be sent from the client device 200 to the host device 250. As another example, a position of the cursor within a client image (and/or a target display area) can be determined that the client device 200 based on an origin of the client image (and/or the target display area). The position of the cursor with respect to the origin of the client image (and/or the target display area) can be sent from the client device 200 to the host device 250. Based on position of the cursor with respect to the origin of the client image (and/or the client display area), the host device 250 can calculate the position of the cursor with respect to a host image (and/or a host display area).

As discussed above in connection with FIG. 2, the client device 200 and the host device 250 each include a movement module. The client target movement module 235 is configured to trigger movement of the target display area 21 within the host display area 23 via the host target movement module 245. For example, the client target movement module 235 can be configured to define an indicator configured to trigger movement of the target display area 21 (or a region thereof). The indicator can be sent (via a moving window session) from the client target movement module 235 to the host target movement module 245. The host target movement module 245 can be configured to trigger movement of the target display area 21 (or a region thereof) at the host device 250 within the host display area 23 based on the indicator of the movement.

In response to an indicator of movement of the target display area 21 within the host display area 23, the client image generator 284 can be configured to produce and send an updated client image (or portion thereof) (not shown) based on the host image 20 or an updated host image (not shown). For example, the target display area 21 (or a region thereof) can have a first position within the host display area 23 as shown in FIG. 2. Based on the first position of the target display area 21 (or a region thereof) within the host display area 23, the client image 22 (which corresponds with the first position of the target display area 21 (or a region thereof) and can be produced by the client image generator 284 from the host image 20) can be received at the client device 200 by the client image processor 277 and displayed within the display 211 by the client display manager 244. The client target movement module 235 can be configured to trigger an indicator of movement of the target display area 21 (or a region thereof) from the first position to a second position within the host display area 23. The movement can be triggered by for example, the input device 242, and the indicator of movement can be received at the host target movement module 245. An updated client image (not shown) can be produced based on the second position of the target display area 21 (or a region thereof) within the host display area 23 by the client image generator 284, and the updated client image (or a portion thereof) can be sent to the client device 200. In some implementations, the updated client image (or a portion thereof) can be based on the host image 20 or based on an updated host image (not shown). In some implementations, the client image 22 being displayed in the display 211 can be referred to as a current client image. A client image previously displayed in the display 211 (before the current client image) can be referred to as a prior client image, and the updated client image being sent from the host device 250 to the client device 200 as an update to the current image can also be referred to as subsequent image.

In some implementations, similar to the client image 22, the updated client image (or portion corresponding with a region) can be encoded at the host device 250 by the encoder 286 (e.g., from a bitmap image to a compressed image) before being sent to the client device 200. Accordingly, the updated client image (or portion thereof that has been encoded can be decoded at the client device 200 by the decoder 272 before being displayed in the display 211. Also, in some implementations, the host image 20 can be encoded at the host device 250 by the encoder 286 before being sent to the client device 200 for storage as a copied host image 20' (also can be referred to as a copy of the host image 20). The copied host image 20' that has been encoded can be decoded at the client device 200 by the decoder 272 before the copied host image 20' (or portions thereof) is displayed in the display 211.

In this implementation, the host display module 215 of the host device 250 is configured to send a copy of the host image 20 to and stored at the client display module 210 of the client display device 200 as a copied host image 20'. As shown in FIG. 2, in some implementations, the copied host image 20' can be referred to as a full scope image of the host image 20. In some implementations, the copied host image 20' can be stored in the client memory 220. The copied host image 20' can be sent to and stored at the client display module 210 of the client display device 200 so that the copied host image 20' (or portions thereof) can be used in response to movement of the target display area 21 (or a region thereof) within the host display area 23. Specifically, portions of the copied host image 20' stored at the client display device 200 can be used to update a current (or prior) client image in response to a change in position of the target display area 21 (or a region thereof) in a relatively rapid fashion. In some implementations, portions of the copied host image 20' stored at the client display device 200 can be used to update a current (or prior) client image (or portion thereof corresponding to a region) in the event that an updated (or subsequent) client image (or portion thereof) from the host device 250 is delayed.

In some implementations, a client image (or portion thereof) that is updated based on a copied host image 20' can be referred to as a transition image. The transition image can function as a temporary updated client image until an updated client image is received from the host device 250 at the client device 200. As shown in FIG. 2, the image receiver 270 of the client display module 210 includes a transition image module 279 configured to produce one or more transition images based on combinations of a client image (e.g., client image 22) and a copied host image (e.g., copied host image 20'). The transition image can correspond with an updated position of the target display area 21 (or a region thereof). The updated position of the target display area 21 (or a region thereof) may cover (e.g., capture) new areas within the host display area 23 that are outside of an area covered by a current (or prior) client image. Because the target display area 21 at the updated position may cover new areas that are outside of the client image, the transition image can function as a temporary updated client image that includes valid portions of the current client image and new areas within the target display area 21 (or a region thereof) at the updated position that can be filled in with portions of the copied host image. Specifically, the transition image can be defined by the transition image module 279 based on portions of a client image that correspond with an updated position of the target display area 21 (and will exclude portions of the client image that are outside of the updated position of the target display area 21) and portions of a copied host image that correspond with the updated position of the target display area (and are not covered by the client image).

In some implementations, a transition image, which can be triggered for display as a client image, can have an aspect ratio different than an aspect ratio of the copied host image 20' (and/or the host image 20). In some implementations, the transition image can be defined based on initialization parameter values and/or modification parameter values (e.g., offset boundary values, dimension values, default initial position values, offset values) exchanged during establishment or modification of a moving window session such as those described in connection with, for example, the figures above. Accordingly, in some implementations, the target display area 21 (or a region thereof) and/or the transition image (or a portion thereof) can include at least some portions of an area (e.g., a background image) outside of the copied host image 20' (and/or the host image 20). More details related to transition images are described below.

As a specific example, a region of the target display area 21 can have a first position within the host display area 23 as shown in FIG. 2. Based on the first position of the region of the target display area 21 within the host display area 23, a portion of the client image 22 (which corresponds with the first position of the region of the target display area 21 and can be produced by the client image generator 284 from the host image 20) can be received at the client device 200 by the client image processor 277 and displayed within the display 211 by the client display manager 244. Also, a copy of the host image 20 can be sent by the host image generator 282 to the host image processor 278 of the client device 200 and can be stored as copied host image 20' at the client device 200. The client target movement module 235 can be configured to trigger an indicator of movement of the region of the target display area 21 from the first position to a second position within the host display area 23. The movement can be triggered by for example, the input device 242, and the indicator of movement can be received at the host target movement module 245. The movement of the region of the target display area 21 can cover at least a portion of an area included in the portion of the client image 22, but may cover a new area that is not covered by a relatively recent prior client image or current client image.

In this example, the transition image module 279 can be configured to define a transition image that corresponds with the second position of the region of the target display area within the host display area 23. The transition image can include a combination of portions of the client image 22 that correspond with the second position of the region of the target display area 21 (and will exclude portions of the portion of the client image 22 that are outside of the second position of the target display area 21) and portions of the copied host image 20' that correspond with the updated position of the region of the target display area (and are not covered by the portion of the client image). Specifically, because the target display area 21 at the updated position covers new area outside of the client image 22, the transition image can function as a temporary updated client image that includes valid portions of the client image 22 and the new area within the target display area 21 at the updated position that can be filled in with portions of the copied host image 20'. Accordingly, the transition image can approximate an updated client image (not shown and not yet received) corresponding with the second position of the region of the target display area 21 within the host display area 23. The transition image can be defined by the transition image module 279 before the updated client image is produced based on the second position of the target display area 21 within the host display area 23 and sent to the client device 200.

In some implementations, processing delays, bandwidth issues associated with a communication link between the client device 200 and host device 250, differences in timing of processing, and/or so forth can result in an updated client image being sent from the host device 250 to the client device 200 with an undesirable delay. For example, a round-trip delay between the client device 200 and the host device 250 caused by limited network bandwidth between the client device 200 and host device 250 can result in an undesirable delay between receiving an indicator of a movement of the target display area 21 at the host device 250 and sending of an updated client image to the client device 200 in response to the indicator of the movement of the target display area 21. Such undesirable delay can result in relatively slow updates at the display 211 in response to movement of the target display area 21 within the host display area 23. In such instances, one or more transition images can be produced by the transition image module 279 and displayed within the display 211 until an updated client image is received.

In some implementations, a transition image produced by the transition image module 279 can be replaced by an updated client image upon receipt of the client image at the client image processor 277. In some implementations, multiple transition images can be produced by the transition image module 279 and displayed at the client device 200 until an updated client image is received. In some implementations, a transition image may not be produced by the transition image module 279 if an updated client image is received in a timely fashion (e.g., within a threshold period of time, before the transition image is displayed at the display 211).

FIGS. 10A through 10D are diagrams that illustrate transition images produced based on copied host images, according to an implementation. The images shown in FIGS. 10A through 10D are processed at a client device. The image processing associated with the images illustrated in FIGS. 10A through 10D can be performed after a moving window session is established between a host device and the client device. Although FIGS. 10A through 10D are discussed in the context of a target display area, the concepts described herein can be applied to one or more regions of the target display area.

Figure 10A:
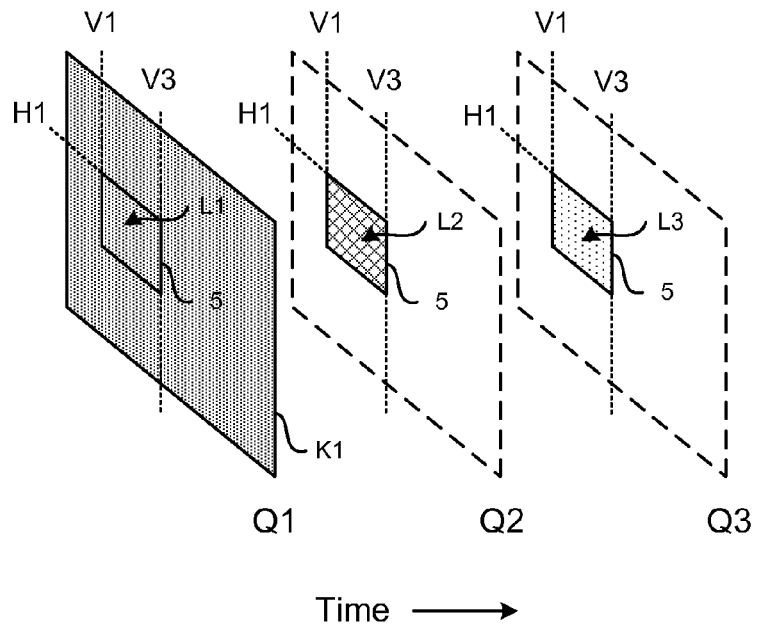
FIGS. 10A through 10D are diagrams that illustrate transition images produced based on copied host images, according to an implementation.

As shown in FIG. 10A, a copied host image K1 is received at time Q1 and stored at the client device. The copied host image K1 can be a copy of a host image produced at the host device in response to processing performed by an application.

At time Q1, a portion of the copied host image K1 is displayed at the client device as client image L1 based on a target display area 5 at target coordinates (H1, V1). As shown in FIG. 10A, the client image L1 has a right edge aligned along a vertical line V3.

At time Q2, a client image L2 is received at the client device and is displayed at the client device based on the target display area 5 at target coordinates (H1,V1). The client image L2 can be an update to client image L1 at the target coordinates (H1,V1). The client image L2 can be based on a host image that is an update to the host image copied as host image K1. As shown in FIG. 10A, the client image L2 has a right edge aligned along the vertical line V3.

At time Q3, a client image L3 is received at the client device and is displayed at the client device based on the target display area 5 at target coordinates (H1,V1). The client image L3 can be an update to client image L2 at the target coordinates (H1,V1). The client image L3 can be based on a host image that is an update to the host image used to produce client image L2. As shown in FIG. 10A, the client image L3 has a right edge aligned along the vertical line V3.

Figure 10B:
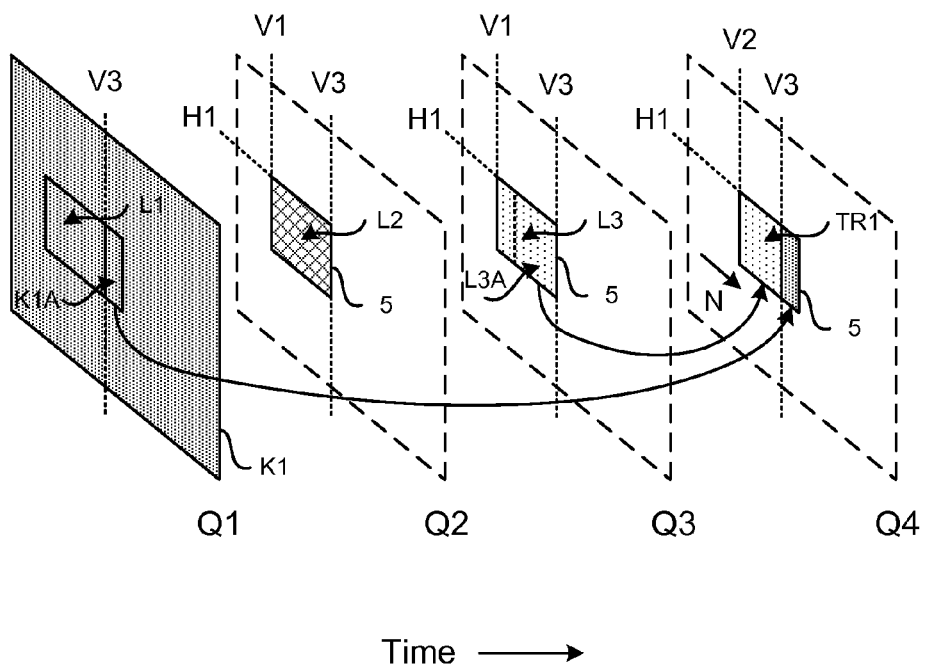

As shown in FIG. 10B, at time Q4, the target display area 5 is shifted to the right along direction N from the target coordinates (H1,V1) to the target coordinates (H1,V2). With the shift of the target display 5 to the right along direction N, a portion of the target display area 5 crosses over the vertical line V3. Accordingly, at time Q4 a transition image TR1 is defined using a portion L3A of the client image L3 and a portion K1A of the copied host image K1. In some implementations, a time period during which the transition image TR1 is triggered for display can be referred to as a transition time period.

Because the transition image TR1 may include some portions that are not synchronized with current images (e.g., host images) produced at the host device, one or more input values from one or more input devices interacting with the transition image TR1 may not be registered (e.g., may be ignored, may be discarded). In other words, interactions (represented by input values) triggered by input devices can be disabled (e.g., temporarily disabled) with respect to the transition image TR1 (e.g., during a transition time period). In some implementations, interactions with the only some portions (e.g., portion K1A and/or portion L1) of the transition image TR1 may be not registered because they can be associated with the host copied image K1, which can be considered as being outdated and may not be synchronized with a current state of processing of the host device.

Figure 10C:
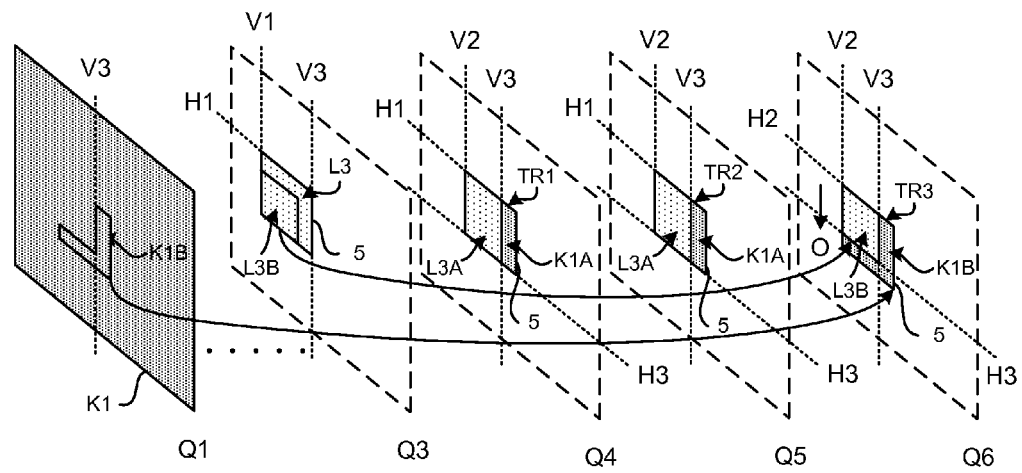

As shown in FIG. 10C, at times Q5, the target display area 5 is at the target coordinates (H1,V2) (which is the same position as at time Q4 shown in FIG. 10B). At time Q5, transition images TR2, respectively, are defined using the portion L3A of the client image L3 and the portion K1A of the copied host image K1. In some implementations, multiple consecutive transitions images, such as transitions images TR1 and TR2, can be defined at the client device when an updated client image has not yet been received from the host device. Accordingly, in some implementations, multiple consecutive transition images can be defined based on combinations of a copied host image and a current or prior client image. If an updated client image had been received from the host device in response to the movement of the target display area 5, one or more of the transitions images used TR1 and TR2 may not have been defined at the client device.

As shown in FIG. 10C, at time Q6, the target display area 5 is shifted in a downward direction along direction O from the target coordinates (H1,V2) to the target coordinates (H2, V2). With the shift of the target display area 5 to downward along direction θ, a portion of the target display area 5 crosses over the horizontal line H3. Accordingly, at time Q6 a transition image TR3 is defined using a portion L3B of the client image L3 and a portion K1B of the copied host image K1. Portion L3B of the client image L3 includes portions of the portion L3A of the client image L3. In other words, portion L3A and portion L3B have overlapping portions. Also, portion K1B of the copied host image K1 includes portions of the portion K1A of the copied host image K1. In other words, portion K1B and portion K1A have overlapping portions.

Figure 10D:
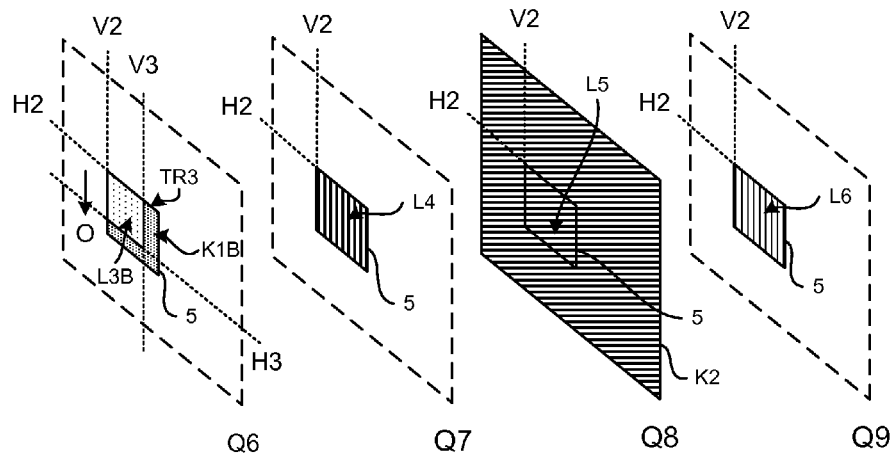

As shown in FIG. 10D, at time Q7, the transition image TR3, which is a combination of the portion K1B of the copied host image K1 and the portion L3B of the client image L3 (originally received that time Q3), is replaced by client image L4. The client image L4 corresponds with the target display area 5 at the target coordinates (H2,V2). Client image L4 can be a portion of a host image (e.g., a new host image) from a host device that corresponds with the target display area 5 at target coordinates (H2, V2). In some implementations, a time period during which the transition images TR1 through TR3 are triggered for display can be referred to as a transition time period.

Also as shown in FIG. 10D, a copied host image K2 is received at the client device from the host device, and the client image L5 is displayed at the client device. The client image L5 corresponds with the target display area 5 at the target coordinates (H2,V2) of the copied host image K2. The copied host image K2 can be cached at the client device for use in defining one or more transition images (if needed). In some implementations, the copied host image K1 can be discarded in response to the copied host image K2 being received. In some implementations, one or more copied host images (e.g., copied host image K1, copied host image K2) can be produced at the host device and sent to the client device, for example, periodically, randomly, based on a schedule, in response to a threshold number or magnitude of movements of a target display area, in response to a request from the client device, after a threshold period of time has passed, based on a specified number of frames being sent to the client device, in response to a relatively significant change in the operating environment (e.g., a number of pixels or opening of a new window) of an application at the host device, and/or so forth.

Finally, as shown in FIG. 10D, the client image L6, which corresponds with the target display area 5 at the target coordinates (H2,V2), is received at the client device and displayed at the client device. In this implementation, a transition image is not created based on the host copied image K2 because the client image L6 is received in a timely fashion before creation of the transition images triggered.

Because the transition images TR1 through TR3 may include some portions that are not synchronized with current images (e.g., host images) produced at the host device, one or more input values from one or more input devices interacting with one or more of the transition images TR1 through TR3 (or a portion thereof) may not be registered (e.g., may be ignored, may be discarded). In some implementations, one or more input values from one or more input devices interacting with only a portion of one or more of the transition images TR1 through TR3 such as portion K1A, may not be registered, while one or more input values from one or more input devices interacting with L3A may be registered. In other words, interactions (represented by input values) triggered by input devices can be disabled (e.g., temporarily disabled) with respect to one or more of the transition image TR1 through TR3 (e.g., or outdated portions thereof, during a transition time period). In some implementations, after transition image TR3 is replaced by client image L4, one or more input values from one or more input devices interacting with the client image L4 can be registered. In other words, interactions triggered by input devices (or registering of interactions) can be enabled (e.g., changed from disabled state). Similarly, interactions triggered by input devices (or registering of interactions) with respect to client images L5 and L6 can also be registered because of these client images are not transition images.

Figure 11:
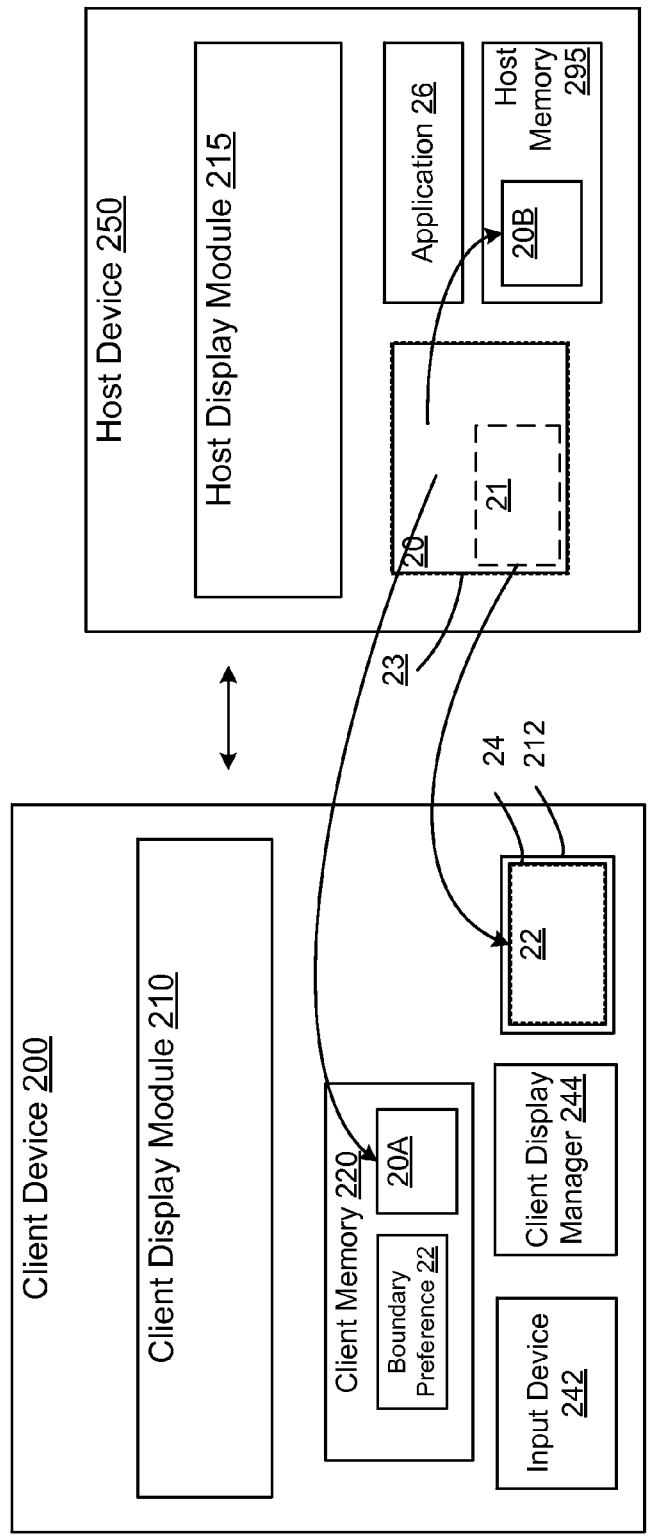
FIG. 11 is a diagram that illustrates the client device and the host device shown in FIG. 2 configured to process mirrored host images.

FIG. 11 is a diagram that illustrates the client device 200 and the host device 250 shown in FIG. 2 configured to process mirrored host images. In this implementation, the components included in the client display module 210 and the host display module 215 are not shown to simplify the illustration. As shown in FIG. 11, the client memory 220 is configured to store a copy of the host image 20, which can be referred to as mirrored host image 20A, and a host memory 295 is configured to store a copy of the host image 20, which can be referred to as mirrored host image 20B. In some implementations, the mirrored host image 20A and/or the mirrored host image 20B can be non-encoded (e.g., uncompressed) or encoded (e.g., compressed) images.

The mirrored host image 20A and mirrored host image 20B can be referred to as mirrored because changes to the mirrored host image 20A can be mirrored in the mirrored host image 20B, and vice versa. Accordingly, the mirrored host image 20A can be a duplicate of the mirrored host image 20B even with changes to either of the mirrored host images 20A, 20B. In other words, the mirrored host image 20A and mirrored host image 20B can be synchronized with one another by continually mirroring updates to either of the host images 20A, 20B.

The mirrored host image 20A is stored (e.g., cached, temporarily stored) in the client memory 220 and the mirrored host image 20B is stored (e.g., cached, temporarily stored) in the host memory 295 so that updated client images can be processed in an efficient fashion (e.g., bandwidth efficient fashion, low bandwidth fashion, relatively low bitrate fashion). Specifically, the encoder 286 includes a difference encoder configured to identify one or more differences (e.g., incremental changes) between an updated client image produced at the host device 250 and the mirrored host image 20B (stored at the host device 250). Rather than sending the entire updated client image (or a portion thereof), one or more indicator(s) of the difference(s) between the updated client image and the mirrored host image 20B can be sent to the client device 200. The decoder 272 of the client device 200 includes a difference decoder configured to decode the one or more indicators of the difference(s) with reference to the mirrored host image 20A (stored at client device 200) to reproduce the updated client image at the client device 200. Accordingly, the updated client image produced at the host device 250 can be reproduced at the client device 200 in an efficient fashion by sending one or more indicators of differences between the updated client image and the mirrored host images 20A, 20B.

In some implementations, one or more indicators of one or more differences can be included in, for example, one or more packets, one or more instructions, and/or so forth. In some implementations, one or more indicators of one or more differences can include motion vectors, motion estimation information, compressed portions, and/or so forth.

In some implementations, the indicators of the differences (e.g., incremental changes) from the updated client image can be used to update the mirrored host image 20A and the mirrored host image 20B. Accordingly, the mirrored host image 20A and the mirrored host image 20B can be synchronized (e.g., mirrored). For example, the difference encoder can be configured to identify a difference between an updated client image produced at the host device 250 and the mirrored host image 20B (stored at the host device 250). An indicator of the difference can be used to update the mirrored host image 20B at the host device 250 and the indicator of the difference can also be sent from the host device 250 to the client device 200. The difference decoder can be configured to decode the indicator of the difference with reference to the mirrored host image 20A (stored at client device 200) to reproduce the updated client image at the client device 200. Also, the indicator of the difference can be used to update the mirrored host image 20A. Accordingly, the updated client image produced at the host device 250 can be reproduced at the client device 200 and the mirrored host images 20A, 20B can be maintained in a synchronized state (e.g., mirrored state). In some implementations, because the mirrored host image 20A and the mirrored host image 20B are used as references from which encoding and decoding of differences can be performed (e.g., performed to produce client images), the mirrored host images 20A, 20B can be referred to as reference host images.

In some implementations, differences (e.g., deltas) that can be used to produce an updated client image at the host device 250 and reproduce the updated client image at the client device 200 can be triggered in response to movement of the target display area 21. For example, the client image 22, which is displayed at the client display area 24 of the display 211 of the client device 200, can be produced based on the target display area 21 within the host display area 23 (illustrated by dashed line) of the host image 20. In response to an indicator of movement of the target display area 21 within the host display area 23 from a first position to a second position, the client image generator 284 can be configured to produce an updated client image (or portion thereof) to the client image 22 based on the host image 20. An indicator of a difference between the updated client image and the mirrored host image 20B can be used to update the mirrored host image 20B in an area corresponding with the target display area 21 at the second position. The indicator of the difference can be used at the client device 200 to reproduce the updated client image and update the mirrored host image 20A in an area corresponding with the target display area 21 at the second position. Accordingly, the updated client image produced at the host device 250 can be reproduced at the client device 200 and the mirrored host images 20A, 20B can be maintained in a synchronized state (e.g., mirrored state) in response to movement of the target display area 21. The mirroring of host images can be used to process (e.g., encode and/or decode) portions of images associated with regions of the target display area 21 that can be used to produce a client image (e.g., client image 22).

In some implementations, one or more transition images can be used in conjunction with the indicators of differences described above. For example, in response to movement of a target display area a transition image can be defined and triggered for display as a first client image. After the transition image has been defined, a second client image can be defined and triggered for display based on an indicator of a difference from a mirrored host image. In other words, the techniques described in connection with, for example, FIGS. 10A through 10D can be used in conjunction with processing of (e.g., generation of, production of) client images related to mirrored host images. As another example, in response to movement of a target display area, a first client image can be defined and triggered for display based on an indicator of a difference from a mirrored host image. After the first client image has been triggered for display, a transition image can be defined and triggered for display as a second client image based on the mirrored host image (which can be updated based on the indicator of the difference).

In some implementations, a client image defined based on one or more mirrored host images, can have dimensions (e.g., an aspect ratio) or a resolution different than dimensions (e.g., an aspect ratio) or a resolution of the mirrored host image(s) (and/or the host image 20). In some implementations, the client image, which can be defined based on one or more mirrored host images, can also be defined based on initialization parameter values (e.g., offset boundary values, dimension values, default initial position values, offset values) exchanged during establishment of client host session such as those described in connection with, for example, FIGS. 4 through 9. Accordingly, in some implementations, the target display area and/or the client image, which can be defined based on one or more mirrored host images, can include at least some portions of an area (e.g., a background image) outside of the mirrored host image(s) (and/or the host image 20).

Although not explicitly shown in FIG. 11, the target display area 21 can include one or more regions that can be processed with respect to the host image 20, the mirrored image 20A, and the mirrored image 20B. Similarly, regions of the client display area 24 can be processed with respect to the host image 20, the mirrored image 20A, and mirrored image 20B. In such implementations, the host image 20 (and mirrored images 20A, 20B) can be used to update differences of more than one region (e.g., more than one sub-region) of the target display area 21. The regions of the target display area 21, and corresponding regions of the client display area 24, can be associated with one or more parameter values defining characteristics of each of these regions.

Figure 12:
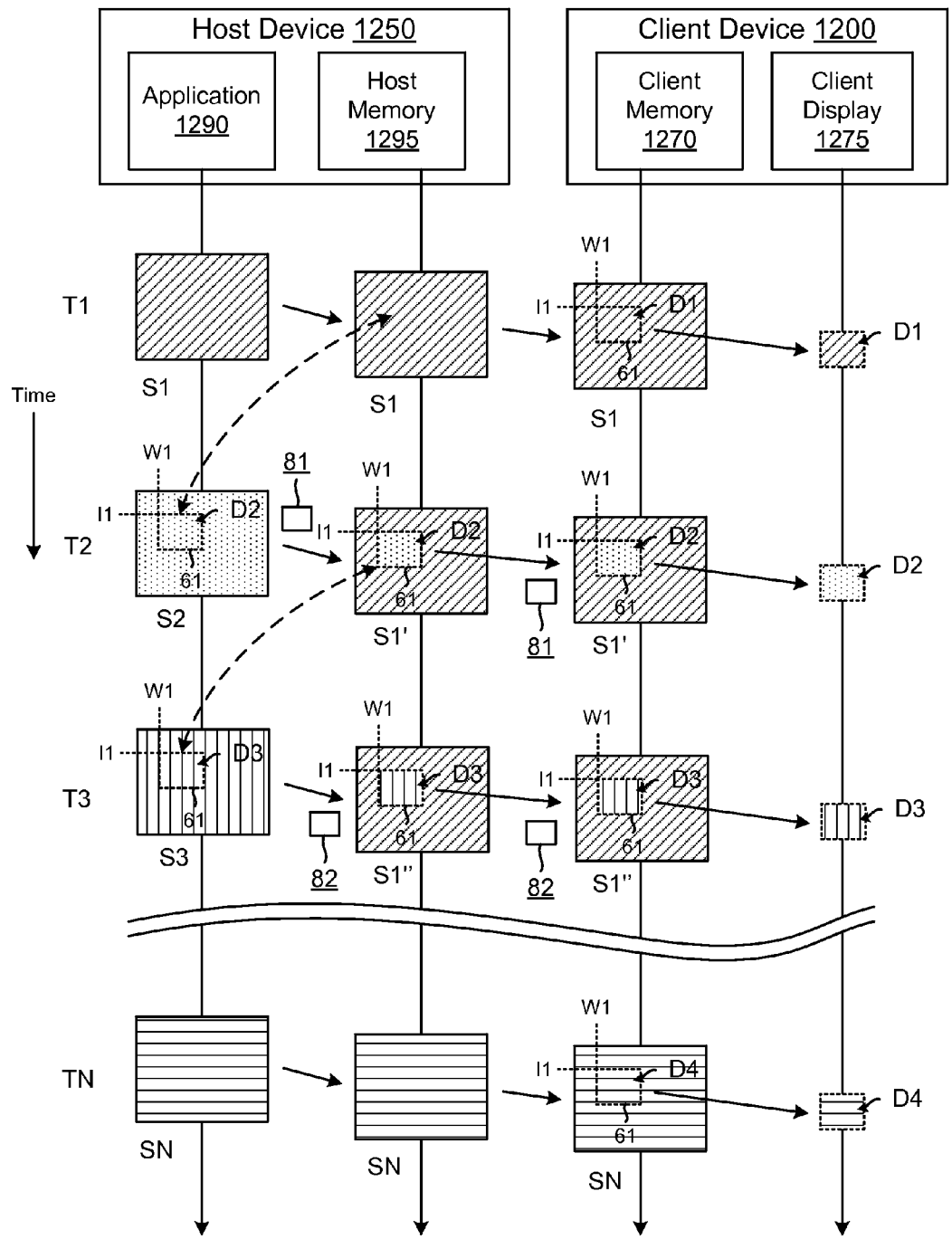
FIG. 12 is a timing diagram that illustrates processing based on mirrored host images, according to an implementation.

FIG. 12 is a timing diagram that illustrates processing based on mirrored host images, according to an implementation. Specifically, the timing diagram illustrates an application 1290 and a host memory 1295 included in a host device 1250, and a client memory 1270 and a client display 1275 included in a client device 1200. At least some processing modules (e.g., image processing modules) included in the host device 1250 and/or in the client device 1200, such as a difference encoder and a difference decoder shown in FIG. 2, are not shown in this timing diagram. As shown in FIG. 12, time is increasing in a downward direction.

As shown in FIG. 12, a series of host images S1 through SN are produced by an application 1290 operating a host device 1250, respectively, at approximately times T1 through TN. One or more of the host images S1 through SN can be produced in response to one or more operations triggered by the application 1290, in response to interactions of a user with the application 1290 at the host device 1250 via the client device 1200 through a moving window session (e.g., a remote desktop session), and/or so forth. In some implementations, one or more of the images (or portions thereof) shown in FIG. 12 (e.g., host images S1 through SN, client images, indicators of differences) can be encoded and/or decoded at the host device 250 and/or at the client device 200 shown in FIG. 2.

As shown in FIG. 12, the host image S1 is produced by an application 1290 at approximately time T1. The host image S1 (e.g., a copy of the host image S1) is stored (e.g., cached) as a mirrored host image (which can be encoded) in the host memory 1295, and is sent to the client device 1200 for storage (e.g., caching) in the client memory 1270 as a mirrored host image (which can be encoded). Based on a position of a target display area 61 within the host image S1 (and/or with respect to a host display area) at target coordinates (W1,I1) a portion D1 of the host image S1 (stored at the client memory 1270) is triggered for display (after being decoded) within the client display 1275 as a client image.

At approximately time T2, the host image S2 is produced by the application 1290. A portion D2 of the host image S2 corresponding with the target display area 61 at target coordinates (W1, I1) is compared (as illustrated by the dashed double-sided arrow) with the host image S1 stored in the host memory 1295 to identify differences (e.g., deltas, incremental changes) (if any) between the portion D2 of the host image S2 and the host image S1. In some implementations, the portion D2 of the host image S2 corresponding with the target display area 61 at target coordinates (W1, I1) is compared with an area of the host image S1 corresponding with the target display area 61 at target coordinates (W1, I1). The differences can be encoded (e.g., encoded by a difference encoder) as encoded differences 81 (or indicators thereof), and can be used (e.g., used by a difference decoder) to modify the host image S1 stored in the host memory 1295 to host image S1'. In such implementations, the host image S1 (or portion thereof) can be a reference image to calculate the encoded difference 81. Accordingly, the host image S1' will be a combination of the host image S1 and the host image S2. In some implementations, another area of host image S1, outside of, or in addition to, the area corresponding with target coordinates (W1,I1) can be used as a reference to calculate the encoded differences 81 (to achieve a relatively low bit rate).

The encoded differences 81 are sent from the host device 1250 to the client device 1200 where the encoded differences 81 can be used (e.g., used by (e.g., decoded by) a difference decoder) to modify the host image S1 stored in the client memory 1270 to host image S1', which mirrors the host image S1' stored in the host memory 1295. Based on a position of the target display area 61 within the host image S1' at target coordinates (W1,I1) the portion D2 of the host image S1' (stored at the client memory 1270) is triggered for display within the client display 1275 as a client image.

At approximately time T3, the host image S3 is produced by the application 1290. A portion D3 of the host image S3 corresponding with the target display area 61 at target coordinates (W1, I1) is compared (as illustrated by the dashed double-sided arrow) with the host image S1' stored in the host memory 1295 to identify differences (if any) between the portion D3 of the host image S3 and the host image S1'. The differences can be encoded (e.g., encoded by a difference encoder) as encoded differences 82 (or indicators thereof), and can be used to modify the host image S1' stored in the host memory 1295 to host image S1". Accordingly, the host image S1" will be a combination of the host image S1' and the host image S3, or can be equivalent to a combination of the host image S1 and the host image S3.

The encoded differences 82 are sent from the host device 1250 to the client device 1200 where the encoded differences 82 can be used (e.g., used by (e.g., decoded by) a difference decoder) to modify the host image S1' stored in the client memory 1270 to host image S1", which mirrors the host image S1" stored in the host memory 1295. Based on a position of the target display area 61 within the host image S1" at target coordinates (W1,I1) the portion D3 of the host image S1" (stored at the client memory 1270) is triggered for display within the client display 1275 as a client image. In some implementations, the encoded differences 81 and/or the encoded differences 82 can be based on an area larger than the target display area 61.

As shown in FIG. 12, the host image SN is produced by the application 1290 at approximately time TN. The host image SN (e.g., a copy of the host image SN) (which can be encoded) is stored as a mirrored host image in the host memory 1295 and replaces a prior mirrored host image (e.g., host image S1") stored in the host memory 1295. The host image SN is also sent to the client device 1200 for storage in the client memory 1270 as a mirrored host image (which can be encoded) and replaces a prior mirrored host image (e.g., host image S1") stored in the client memory 1270. Based on a position of a target display area 61 within the host image SN (and/or with respect to a host display area) at target coordinates (W1,I1) a portion D4 of the host image SN (stored at the client memory 1270) is triggered for display (after being decoded) within the client display 1275 as a client image. In some implementations, one or more transition images can be defined and triggered for display as a client image within the timeline described above (e.g., after time T3 and before time TN, before time T1) based on one or more mirrored images stored at the client memory 1270 and one or more client images triggered for display at the client display 1275.

Although not explicitly shown in FIG. 12, the target display area 61 can include one or more regions. For example, although not shown, portions (e.g., portions D1, D2, D3, D4) can be regions within a target display area that are less than all of the target display area. The regions can be associated with one or more parameter values defining characteristics of each of the regions. Each of regions can be associated with a stream of images used to produce client images.

Referring back to FIG. 2, rendering of content in the host display area 23 can be modified so that processing of portions of host images (e.g., host image 20) in a remote desktop session (e.g., a moving window session) can be handled in a desirable fashion. Specifically, graphics settings 17 of the application 26 can be modified so that compression of images transmitted between the host device 250 and the client device 210 can be handled in a desirable fashion (e.g., in an efficient fashion). For example, the complexity of a user interface of the application 26 can be reduced to facilitate more efficient compression of, for example, portions of the host image 20 included in the target display area 21 as the client image 22, which is displayed in the client display area 24 of the display 211.

The graphics settings 17 of the application 26 can be modified based on a compression scheme (e.g., compression protocol, codec, bandwidth requirements or limitations) used to handle image processing between the client device 200 and the host device 250. The compression schemes can include, for example, VP8, H.264, MJPEG, and/or so forth. As shown in FIG. 2, the host display module 215 includes a graphics setting handler 292 configured to define or change the graphics settings 17 of the application 26 based on a compression scheme. For example, if a first compression scheme is used to transmit images from the host device 250 to the client device 200, the graphics settings 17 can be defined to have a first set of values by the graphics setting handler 292. If a second compression scheme is used to transmit images from the host device 250 to the client device 200, the graphics settings 17 can be defined to have a second set of values by the graphics setting handler 292. Accordingly, the graphics settings 17 can be adapted by the graphics setting handler 292 based on the compression scheme used to transmit images between the host device 250 of the client device 200.

Although not shown in FIG. 2, in some implementations, the client display module 210 can include graphics settings handler similar to the graphics setting handler 292 included in the host display module 215. The graphics settings handler of the client display module 210 can be configured to define one or more graphics settings for the application 26 that can be implemented at the host device 250. In some implementations, graphics settings handler the client display module 210 can be configured to define one or more graphics settings based on one or more compression schemes. In some implementations, graphics settings 17 of the application 26 can be modified to improve performance using one or more compression schemes.

In some implementations, a compression scheme can be negotiated between the client device 200 and the host device 250 by the client connection module 230 of the client device 200 and the host connection module 237 of the host device 250. Accordingly, one or more graphics settings 17 can be based on a compression scheme negotiated between the client device 200 and the host device 250 during, for example, the establishment of a remote desktop session (e.g., a moving window session) between the client device 200 and host device 250. In some implementations, the compression scheme can be defined within one or more parameter values (e.g., initiation parameter values, modification parameter values, parameter values associated with one or more regions) exchanged between the client device 200 and host device 250. For example, the client connection module 230 can send to the host connection module 237 an indicator of a compression scheme to be used during a remote desktop session (e.g., a moving window session) between the client device 200 and host device 250. Similarly, the host connection module 237 can send to the client connection module 230 an indicator of a compression scheme to be used during a remote desktop session (e.g., a moving window session) between the client device 200 and host device 250. The compression scheme that is to be used during the remote desktop session (e.g., the moving window session) can trigger defining of one or more portions of the graphics settings 17 of the application 26.

The graphics settings 17 of the application 26 can be related to a variety of settings of the application 26. In some implementations, the graphics settings 17 can be operating system-level settings associated with the application 26 that can be modified by the graphics setting handler 292. In some implementations, the graphics settings 17 of the application 26 can include, or can be related to, any combination of for example, a background image, font rendering, desktop icons, window layouts, alpha blending, special effects, font colors, object appearance (e.g., shape, color), three-dimensional effects, and/or so forth. In some implementations, the graphics settings 17 can be defined and are modified to, for example, remove high frequency components, reduce area with content change, and/or so forth that may be relatively expensive from a computational perspective for one or more compression schemes that can be employed by the client device 200 and/or the host device 250. In some implementations, the settings can be modified without affecting access of a user to the actual content of the remote desktop session (e.g., a moving window session) in an undesirable fashion while reducing content complexity and improving compression performance.

For example, one or more of the graphics settings 17 of the application 26 can be defined and/or modified to reduce or increase the complexity of a background image for one or more compression schemes. In such implementations, the background image can be changed to a relatively simple background image, a single color, and so forth.

In some implementations, one or more of the graphics settings 17 of the application 26 can be defined and/or modified to add or remove anti-aliasing to font rendering for one or more compression schemes. In such implementations, sharp edges of a font can be reduced so that rendering of the font can be handled in a more efficient fashion by one or more compression schemes.

In some implementations, one or more of the graphics settings 17 of the application 26 can be defined and/or modified to add or removing desktop icons for one or more compression schemes. In such implementations, all desktop icons or relatively unused desktop icons can be hidden so that rendering of images that can include a desktop background within the remote desktop session (e.g., a moving window session) can be more efficiently processed by removing some or all desktop icons.

In some implementations, one or more graphics settings 17 of the application 26 can be configured to define a grid size for a window layout to resize windows to the grid, show only windows that are on top (layered on top of other windows), remove alpha blending of windows, and/or so forth for one or more compression schemes. In such implementations, processing related to windows and the layout of the windows can be reduced for one or more compression schemes. In such implementations, correlation between neighboring frames can be increased and residual data after motion estimation can be used. Accordingly, the effectiveness of one or more compression schemes can be improved.

In some implementations, one or more graphics settings 17 of the application 26 can be configured to modify (e.g., increase, decrease, turn off, turn on) one or more effects (e.g., animantion) associated with the application 26 such as three-dimensional effects, fade in and fade out effects, and/or so forth for one or more compression schemes. In such implementations, reduction of special effects can facilitate more efficient compression because motion within the remote desktop session (e.g., the moving window session) can be reduced.

In some implementations, one or more graphics settings 17 of the application 26 can be configured to reduce or increase font colors for one or more compression schemes. In some implementations, one or more graphics settings 17 of the application 26 can be configured to reducing or increase font colors for one or more compression schemes. In some implementations, one or more graphics settings 17 of the application 26 can be configured to change the appears of objects associated with the application 26 such as the reduction or increase in rounded edges one or more objects for one or more compression schemes.

In some implementations, to centralize the change of graphics settings 17, a profile (e.g., a remote profile) for the graphics settings 17 can be created for one or more users (e.g., user accounts). In some implementations, one or more profiles for a user can be stored in, for example, the host memory 295 of the host device 250 and/or in the client memory 220 of the client device 200. Accordingly, after a compression scheme has been selected, one or more profiles for the graphics settings 17 that is associated with the selected compression scheme can be retrieved and implemented. In other words, one or more profiles for the graphics settings 17 can be retrieved in response to, or based on, one or more compression schemes.

In some implementations, one or more profiles can include information related to setup some or all of the graphics settings 17 that can be related to any of the elements described above such as background image, anti-aliasing, icons on desktop, window layout, 3D effects, alpha blending, etc. In some implementations, one or more profiles can be customized by a user. In other words, one or more profiles, or portions thereof, can be defined by a user having specific requirements (e.g., specific quality requirements).

In addition to profiles, a post-processing module 287 (e.g., daemon code, daemon hardware and/or software module) operating in the background on the host device 250 can be configured to perform post-processing to reduce content complexity or make compression more effective without affecting a user's access to the desired data using the client device 200. For example, if anti-aliasing cannot be removed by profile management of one or more of the graphics settings 17, the post-processing daemon module 287 can be configured to use, for example, digital signal processing (DSP) module to remove anti-aliasing before sending the pixel data for compression by one or more compression schemes associated with the remote desktop session (e.g., the moving window session). A post-processing method can be configured to substantially alleviate the burden on compression and transport, while preserving the desirable content features. In some embodiments, the post-processing daemon module 287 can be configured to perform post-processing with respect to a particular region of a target display area or a host display area.

The components (e.g., modules, processors) of the client device 200 and/or the components (e.g., modules, processors) of the host device 250 can be configured to operate based on one or more platforms (e.g., one or more similar or different platforms) that can include one or more types of hardware, software, firmware, operating systems, runtime libraries, and/or so forth. In some implementations, the components of the client device 200 and/or the components of the host device 250 can be configured to operate within a cluster of devices (e.g., a server farm). In such an implementation, the functionality and processing of the components of the client device 200 and/or the components of the host device 250 can be distributed to several devices of the cluster of devices.

The components of the client device 200 and/or the components of the host device 250 can be, or can include, any type of hardware and/or software. In some implementations, one or more portions of the components shown in the components of the client device 200 and/or the components of the host device 250 in FIG. 2 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the client device 200 and/or the components of the host device 250 can be, or can include, a software module configured for execution by at least one processor (not shown). In some implementations, the functionality of the components can be included in different modules and/or different components than those shown in FIG. 2.

In some implementations, one or more of the components of the client device 200 and/or the components of the host device 250 can be, or can include, processors configured to process instructions stored in a memory. For example, the client display module 210 (and/or a portion thereof) and/or the host display module 215 (and/or a portion thereof) can be a combination of a processor and a memory configured to execute instructions related to a process to implement one or more functions.

Although not shown, in some implementations, the components of the client device 200 and/or the components of the host device 250 (or portions thereof) can be configured to operate within, for example, a data center (e.g., a cloud computing environment), a computer system, one or more server/host devices, and/or so forth. In some implementations, the components of the client device 200 and/or the components of the host device 250 (or portions thereof) can be configured to operate within a network. Thus, the components of the client device 200 and/or the components of the host device 250 (or portions thereof) can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

In some implementations, the client memory 220 and/or the host memory 295 can be any type of memory such as a random-access memory, a disk drive memory, flash memory, and/or so forth. In some implementations, the client memory 220 and/or the host memory 295 can be implemented as more than one memory component (e.g., more than one RAM component or disk drive memory) associated with the components of the client device 200 and/or the components of the host device 250. In some implementations, the client memory 220 and/or the host memory 295 can be a database memory. In some implementations, the client memory 220 and/or the host memory 295 can be, or can include, a non-local memory. For example, the client memory 220 and/or the host memory 295 can be, or can include, a memory shared by multiple devices (not shown). In some implementations, the client memory 220 and/or the host memory 295 can be associated with a server device (not shown) within a network and configured to serve the components of the client device 200 and/or the components of the host device 250.

Figure 13:
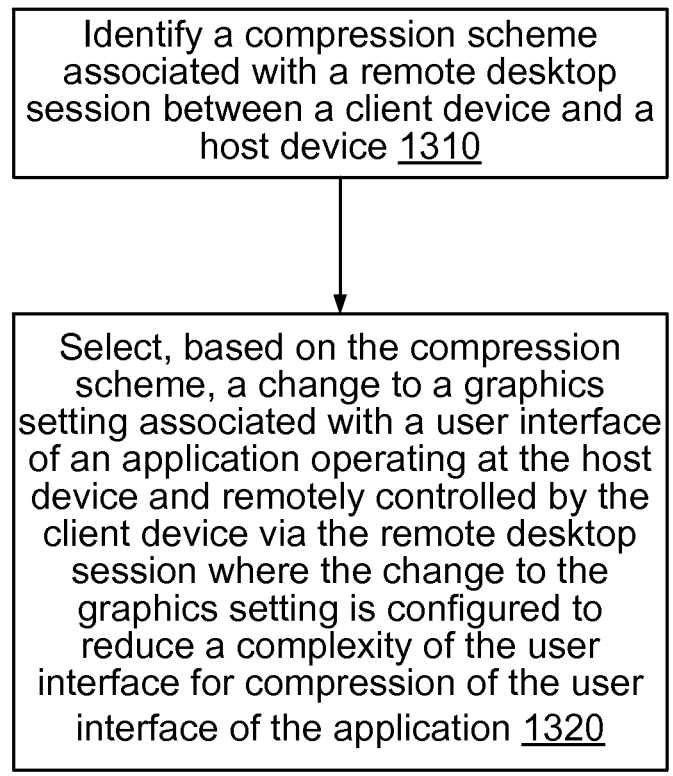
FIG. 13 is a flowchart that illustrates a method for defining a graphics setting based on compression scheme.

FIG. 13 is a flowchart that illustrates a method for defining a graphics setting based on compression scheme. At least some portions of the flowchart can be performed by a client device and/or a host device such as those shown in FIG. 2.

A compression scheme associated with a remote desktop session between a client device and a host device is identified (block 1310). In some implementations, the compression scheme can be defined during establishment of the remote desktop session by the client connection module 230 and/or the host connection module 237 shown in FIG. 2.

A change to a graphics setting associated with a user interface of an application operating at the host device and remotely controlled by the client device via the remote desktop session is selected, based on the compression scheme, where the change to the graphics setting is configured to reduce a complexity of the user interface for compression of the user interface of the application (block 320). In some implementations, the graphics setting can be associated with one or more profiles associated with the user account.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a client device) to perform a process. A computer program, such as the computer program(s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium storing instructions that when executed cause one or more processors to perform a process, the process comprising:
   sending from a client device to a host device an indicator of a size of a target display area of a moving window session with respect to a host display area of an application operating at the host device, the application being remotely controlled via the client device;
   analyzing a stream of images associated with the target display area of the moving window session;
   defining at the client device a plurality of regions within the target display area based on the analyzing; and
   modifying the moving window session without terminating the moving window session and without establishing a new moving window session.

2. The computer-readable storage medium of claim 1, wherein the plurality of regions includes a first region managed based on a first set of parameter values and a second region managed based on a second set of parameter values.

3. The computer-readable storage medium of claim 1, wherein the analyzing includes identifying at least one of a static region of the stream of images or a dynamic region of the stream of images.

4. The computer-readable storage medium of claim 1, wherein the plurality of regions includes a first region refreshed at a first frequency and a second region refreshed at a second frequency.

5. The computer-readable storage medium of claim 1, wherein the size of the target display area is established within a set of initialization parameter values, at least a portion of the plurality of regions are modified within a set of modification parameter values different from the set of initialization parameter values, the moving window session being modified based on the modification parameter values.

6. The computer-readable storage medium of claim 1, further comprising:
   sending from the client device to the host device an offset boundary defining a boundary limiting movement of the target display area with respect to the host display area.

7. The computer-readable storage medium of claim 1, further comprising:
   defining an indicator of a position of the target display area of the client device with respect to the host display area, the indicator of the position being with respect to an origin of the host display area.

8. The computer-readable storage medium of claim 1, further comprising:
   defining an indicator of a position of the target display area of the client device with respect to the host display area, the indicator of the position being an indicator of a change in position of the target display area with respect to the host display area.

9. The computer-readable storage medium of claim 1, wherein the plurality of regions includes a first region managed based on a first set of parameter values and a second region managed based on a second set of parameter values, dimensions of the first region are different than dimensions of the second region, dimensions of the target display are different than dimensions of the host display area.

10. The computer-readable storage medium of claim 1, wherein the host display area includes a host image of at least one user interface of the application.

11. The computer-readable storage medium of claim 1, further comprising:
   defining, in response to an indicator of a change in a position of the target display area, a transition image based on a combination of at least a portion of the stream of images and a portion of a host image.

12. An apparatus, comprising:
   a client connection module configured to exchange a plurality of parameter values with a client device during establishment of a remote desktop session between a host device and the client device,
   at least a portion of the plurality of parameter values identifying a compression scheme of a plurality of regions of a target display area with respect to a plurality of host images produced within a host display area by an application operating at the host device;
   a client target movement module configured to send an indicator of a position of the target display area with respect to the host display area; and
   an image receiver configured to receive at least a portion of a client image associated with at least one region from the plurality of regions based on the indicator of the position of the target display area with respect to the host display area.

13. The apparatus of claim 12, wherein each region from the plurality of regions is associated with an identifier.

14. The apparatus of claim 12, wherein the plurality of regions includes a first region associated with a first refresh rate and a second region associated with a second refresh rate different from the first refresh rate.

15. The apparatus of claim 12, further comprising:
   a stream analysis processor configured to analyze a stream of images associated with the remote desktop session, the plurality of parameter values having at least a portion modified based on the analysis of the stream of images.

16. The apparatus of claim 12, wherein the client connection module is configured to receive an offset boundary defining a boundary of movement of the target display area with respect to the host display area, and the image receiver is configured to define at least a portion of the client image based on a background image outside of the host display area and within the boundary of movement defined by the offset boundary.

17. The apparatus of claim 12, wherein each region from the plurality of regions is managed based on a separate set of parameter values included in the plurality of parameter values.

18. A non-transitory computer-readable storage medium storing instructions that when executed cause one or more processors to perform a process, the process comprising:
   sending from a client device to a host device an indicator of a size of a target display area of a moving window session with respect to a host display area of an application operating at the host device, the application being remotely controlled via the client device;
   analyzing a stream of images associated with the target display area of the moving window session;
   defining at the client device a plurality of regions within the target display area based on the analyzing; and
   refreshing at least a portion of the moving window session asynchronously in response to an asynchronous event.

19. The computer-readable storage medium of claim 18, wherein the asynchronous event includes changing a layered position of a first user interface with respect to a second user interface.

20. The computer-readable storage medium of claim 18, wherein the asynchronous refreshing can override a refresh rate specified within a parameter value.

* * * * *